US012681038B2

(12) United States Patent
Yamamoto et al.

(10) Patent No.: US 12,681,038 B2
(45) Date of Patent: Jul. 14, 2026

(54) VIBRATION MEASUREMENT DEVICE AND CMS DEVICE FOR WIND-POWER GENERATION

(71) Applicants: CHUBU UNIVERSITY EDUCATIONAL FOUNDATION, Aichi (JP); NTN Corporation, Osaka (JP)

(72) Inventors: Kazuo Yamamoto, Kasugai (JP); Taiki Ogawa, Kuwana (JP); Yosuke Suzuki, Kuwana (JP)

(73) Assignees: CHUBU UNIVERSITY EDUCATIONAL FOUNDATION, Aichi (JP); NTN Corporation, Osaka (JP)

( * ) Notice: Subject to any disclaimer, the term of this patent is extended or adjusted under 35 U.S.C. 154(b) by 289 days.

(21) Appl. No.: 18/577,173

(22) PCT Filed: Jul. 4, 2022

(86) PCT No.: PCT/JP2022/026581
§ 371 (c)(1),
(2) Date: Jan. 5, 2024

(87) PCT Pub. No.: WO2023/282226
PCT Pub. Date: Jan. 12, 2023

(65) Prior Publication Data
US 2024/0377429 A1     Nov. 14, 2024

(30) Foreign Application Priority Data
Jul. 8, 2021     (JP) ................................. 2021-113574

(51) Int. Cl.
*G01P 15/00*          (2006.01)
*F03D 17/00*          (2016.01)

(52) U.S. Cl.
CPC ............ *G01P 15/00* (2013.01); *F03D 17/015* (2023.08); *F05B 2260/83* (2013.01)

(58) Field of Classification Search
CPC ......... G01P 15/00; F03D 17/015; G01H 1/00; G01H 17/00; G01M 99/00
See application file for complete search history.

(56) References Cited

U.S. PATENT DOCUMENTS

| | | | | | |
|---|---|---|---|---|---|
| 3,743,869 | A | * | 7/1973 | Hugli | ...................... G01L 9/008 310/329 |
| 2021/0011050 | A1 | * | 1/2021 | Nie | ...................... H10N 30/853 |

FOREIGN PATENT DOCUMENTS

| CN | 204007851 U | 12/2014 |
|---|---|---|
| CN | 207352118 U | 5/2018 |

(Continued)

OTHER PUBLICATIONS

English Machine Translation of Nishiyama et al, JP 2020-60516 A, cited in IDS (Year: 2020).*

(Continued)

*Primary Examiner* — David Z Huang
(74) *Attorney, Agent, or Firm* — Rimon P.C.

(57) ABSTRACT

A vibration measurement device includes an acceleration sensor, an acceleration sensor mounting fixture, a spacer as an insulating member, and a heat shrink tube. The acceleration sensor includes an element. The acceleration sensor mounting fixture is disposed on a side of the acceleration sensor, adjacent to an object under measurement. The spacer is sandwiched between the acceleration sensor and the acceleration sensor mounting fixture so as to be in contact with both the acceleration sensor and the acceleration sensor mounting fixture. The heat shrink tube covers a sensor outer edge and a mounting fixture outer edge. The heat shrink tube includes a region protruding outward of acceleration sensor (Continued)

and the acceleration sensor mounting fixture as viewed from above.

18 Claims, 18 Drawing Sheets

(56) References Cited

FOREIGN PATENT DOCUMENTS

| | | | |
|---|---|---|---|
| EP | 2884099 | A1 | 6/2015 |
| JP | S58-014132 | U | 1/1983 |
| JP | 4-99042 | U | 8/1992 |
| JP | H05-024025 | Y2 | 6/1993 |
| JP | H07-198740 | A | 8/1995 |
| JP | 2009-289551 | A | 12/2009 |
| JP | 2018-115920 | A | 7/2018 |
| JP | 2020-060516 | A | 4/2020 |
| JP | 2020-143930 | A | 9/2020 |
| WO | 2014/024303 | A1 | 2/2014 |

OTHER PUBLICATIONS

English Machine Translation of Fujioka et al, WO 2014/024303 A1, cited in IDS (Year: 2014).*
International Search Report received in international Application No. PCT/JP2022/026581, dated Sep. 20, 2022.

* cited by examiner

---- METAL ACCELERATION     —— INSULATING
     SENSOR MOUNTING             ACCELERATION SENSOR
     FIXTURE                     MOUNTING FIXTURE

FIG.27

VIBRATION MEASUREMENT DEVICE AND CMS DEVICE FOR WIND-POWER GENERATION

CROSS-REFERENCE TO RELATED APPLICATIONS

This application is the U.S. National Phase under 35 U.S.C. § 371 of International Application No. PCT/JP2022/026581, filed on Jul. 4, 2022, which claims the benefit of foreign priority to JP Patent Application No. 2021-113574 filed on Jul. 8, 2021, the entire contents of each of which are hereby incorporated by reference.

TECHNICAL FIELD

The present disclosure relates to a vibration measurement device and a CMS device for wind-power generation using the vibration measurement device.

BACKGROUND ART

A vibration measurement device for measuring vibrations of an object under measurement such as a windmill includes an acceleration sensor and an acceleration sensor mounting fixture for attaching the acceleration sensor. For example, Japanese Patent Laying-Open No. H7-198740 (PTL 1) discloses an acceleration sensor mounting fixture that supports an acceleration sensor with the acceleration sensor mounting fixture fixed to an object under measurement. The acceleration sensor mounting fixture suppresses transmission of base strain on the object under measurement to the acceleration sensor. Further, for example, Japanese Utility Model Laying-Open No. S58-14132 (PTL 2) discloses an improvement to an electrically insulating acceleration sensor mounting fixture for allowing measurement of vibrations under a high temperature by bonding an object under measurement and an acceleration sensor together with welding glass. Further, for example, Japanese Utility Model Publication No. H5-24025 (PTL 3) discloses a vibration measurement device in which a unit base including an insulating film is disposed between an object under measurement and an acceleration sensor. In the vibration measurement device, the unit base including the insulating film prevents a ground loop to be described later to reduce the possibility of mixing of noise into a measurement value.

Such vibration measurement devices each have a problem that when a high-voltage surge caused by a lightning strike or the like is applied to the vibration measurement device, the vibration measurement device fails due to the high-voltage surge to become unable to acquire vibration data. This is because an overvoltage is applied to the acceleration sensor due to the high-voltage surge, and an overcurrent flows. From the viewpoint of suppressing the above, for example, Japanese Patent Laying-Open No. 2009-289551 (PTL 4) introduces a discharge noise absorbing element capable of avoiding noise in all frequency bands such as lightning, static electricity, electromagnetic waves, and magnetism, and a noise avoidance box using the discharge noise absorbing element.

CITATION LIST

Patent Literature

PTL 1: Japanese Patent Laying-Open No. H7-198740
PTL 2: Japanese Utility Model Laying-Open No. S58-14132
PTL 3: Japanese Utility Model Publication No. H5-24025
PTL 4: Japanese Patent Laying-Open No. 2009-289551

SUMMARY OF INVENTION

Technical Problem

In the vibration measurement device including the acceleration sensor and the acceleration sensor mounting fixture, when discharge accompanying a high-voltage surge caused by a lightning strike or the like is suppressed, it is possible to reduce the possibility of a failure of the acceleration sensor. However, none of Japanese Patent Laying-Open No. H7-198740, Japanese Utility Model Laying-Open No. S58-14132, and Japanese Model Publication No. H5-24025 have taken a high-voltage surge caused by a lightning strike or the like and discharge accompanying the high-voltage surge into consideration. Further, Japanese Patent Laying-Open No. 2009-289551 has not taken a high-voltage surge and discharge caused by a lightning strike in the vibration measurement device including the acceleration sensor and the acceleration sensor mounting fixture into consideration.

The present disclosure has been made in view of the above-described problems, and it is therefore an object of the present disclosure to provide a vibration measurement device including an acceleration sensor and an acceleration sensor mounting fixture and being capable of suppressing discharge accompanying a high-voltage surge caused by a lightning strike or the like to reduce the possibility of a failure of the acceleration sensor, and a CMS device for wind-power generation using the vibration measurement device.

Solution to Problem

A vibration measurement device according to the present disclosure includes an acceleration sensor, an acceleration sensor mounting fixture, an insulating member, and an acceleration sensor cable. The acceleration sensor includes an element capable of measuring vibrations of an object under measurement. The acceleration sensor mounting fixture is disposed on a side of the acceleration sensor, adjacent to a position where the object under measurement is to be disposed. The insulating member is sandwiched between the acceleration sensor and the position where the object under measurement is to be disposed. The acceleration sensor cable includes a pair of cable lines, a shield line, and a sheath that ties the pair of cable lines and the shield line together in a bundle and surrounds the pair of cable lines and the shield line from outside.

Advantageous Effects of Invention

According to the present disclosure, it is possible to provide the vibration measurement device including the acceleration sensor and the acceleration sensor mounting fixture and being capable of suppressing discharge accompanying a high-voltage surge caused by a lightning strike to reduce the possibility of a failure of the acceleration sensor.

BRIEF DESCRIPTION OF DRAWINGS

FIG. 27 is a diagram schematically illustrating a configuration of a vibration measurement device according to a fourteenth embodiment.

DESCRIPTION OF EMBODIMENTS

Hereinafter, embodiments of the present disclosure will be described with reference to the drawings.

First Embodiment (Configuration of Vibration Measurement Device)

Figure 1:
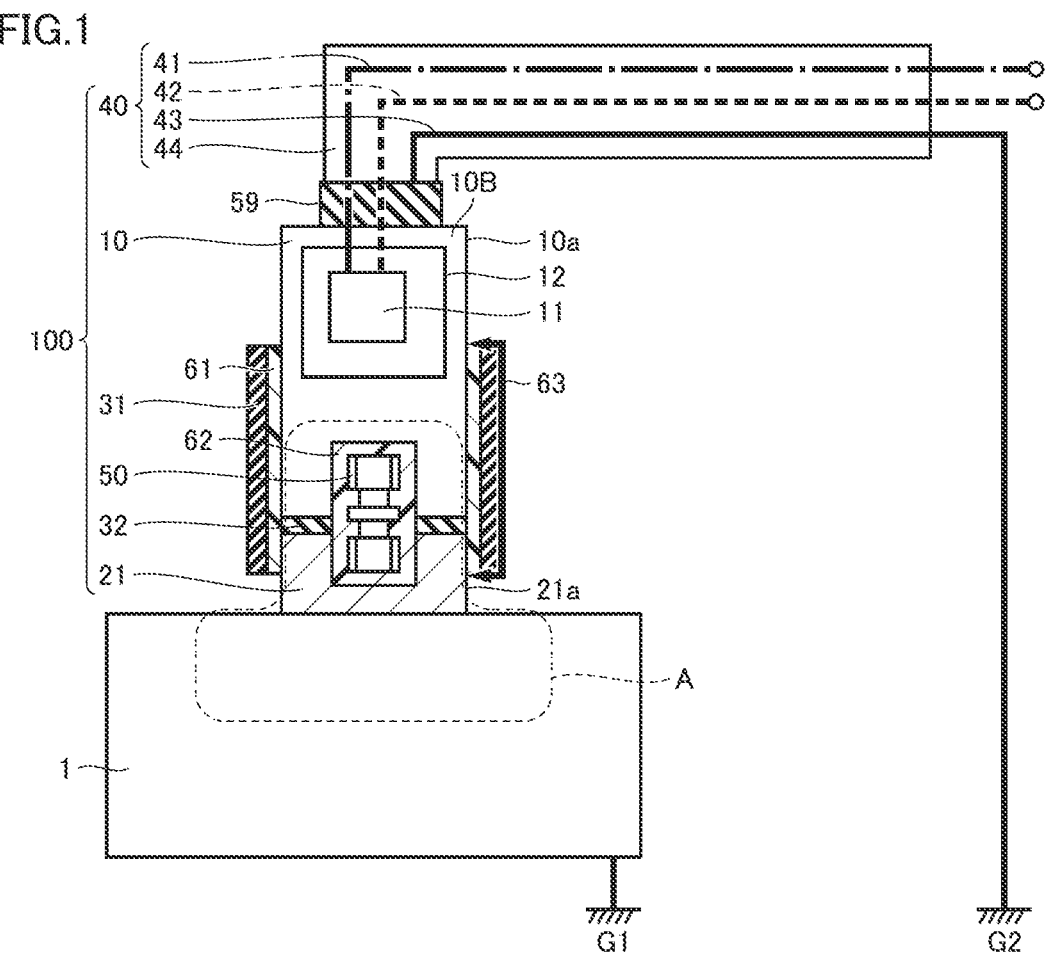
FIG. 1 is a diagram schematically illustrating a configuration of a vibration measurement device according to a first embodiment.

First, a vibration measurement device of the present embodiment will be described with reference to FIGS. 1 to 5. FIG. 1 is a diagram schematically illustrating a configuration of the vibration measurement device according to the first embodiment. In FIG. 1 and the subsequent schematic diagrams, a cross-sectional shape of a device taken along the up-down direction is schematically illustrated. With reference to FIG. 1, vibration measurement device 100 according to the present embodiment primarily includes an acceleration sensor 10, an acceleration sensor mounting fixture 21, a heat shrink tube 31, a spacer 32, an acceleration sensor cable 40, and a stud 50.

Acceleration sensor 10 includes an element 11 capable of measuring vibrations of an object under measurement 1 inside an acceleration sensor housing 10B that is a housing of acceleration sensor 10. Specifically, for example, a cavity 12 may be formed inside acceleration sensor housing 10B made of a conductive material, and element 11 may be disposed in cavity 12. Cavity 12 is not limited to an empty space, and may be filled with an insulating resin material or the like. Examples of object under measurement 1 include a windmill. Here, object under measurement 1 has conductivity. Acceleration sensor mounting fixture 21 is disposed on a side of acceleration sensor 10, adjacent to object under measurement 1, that is, on the lower side in FIG. 1. That is, acceleration sensor mounting fixture 21 is disposed so as to be sandwiched between object under measurement 1 and acceleration sensor 10.

For example, acceleration sensor mounting fixture 21 has a housing made of a conductive material such as metal. Therefore, in a case where acceleration sensor mounting fixture 21 is in direct contact with acceleration sensor 10 and object under measurement 1 between which acceleration sensor mounting fixture 21 is sandwiched, acceleration sensor mounting fixture 21 can make acceleration sensor 10 and object under measurement 1 electrically continuous with each other.

Spacer 32 as an insulating member is disposed so as to be sandwiched between acceleration sensor 10 and acceleration sensor mounting fixture 21 and to be in contact with both acceleration sensor 10 and acceleration sensor mounting fixture 21. Alternatively, spacer 32 may be disposed so as to be sandwiched between acceleration sensor mounting fixture 21 and object under measurement 1 and to be in contact with both acceleration sensor mounting fixture 21 and object under measurement 1. Acceleration sensor 10 and acceleration sensor mounting fixture 21 are coupled to each other by stud 50 as an insulating fixing member with spacer 32 interposed between acceleration sensor 10 and acceleration sensor mounting fixture 21. Stud 50 is disposed so as to pass through spacer 32 between acceleration sensor 10 and acceleration sensor mounting fixture 21. For this reason, acceleration sensor 10 and acceleration sensor mounting fixture 21 may be partially cut out to form a cut-out portion capable of accommodating stud 50, and spacer 32 located between acceleration sensor 10 and acceleration sensor mounting fixture 21 may be formed with a through hole through which stud 50 can pass. Stud 50 is disposed in a single space formed by the cut-out portion and the through hole communicating with each other, and couples acceleration sensor 10, spacer 32, and acceleration sensor mounting fixture 21 together. A filler 62 may be disposed in a gap between stud 50, and acceleration sensor 10 and acceleration sensor mounting fixture 21 to which stud 50 is coupled. Alternatively, filler 62 need not be disposed. Filler 62 is made of a material that is higher in dielectric strength than air. This makes stud 50 and the surrounding area of stud 50 higher in dielectric strength.

Figure 2:
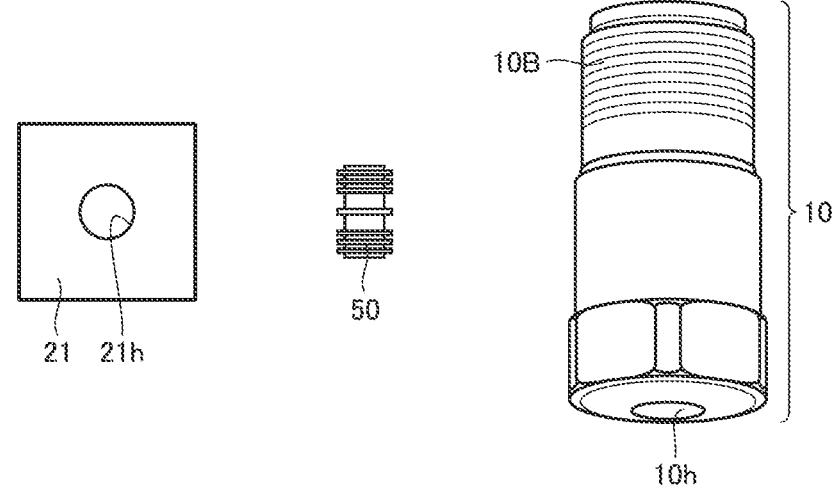
FIG. 2 is a diagram schematically illustrating respective aspects of an acceleration sensor, an acceleration sensor mounting fixture, and a stud that couples the acceleration sensor and the acceleration sensor mounting fixture together.

FIG. 2 is a diagram schematically illustrating respective aspects of the acceleration sensor, the acceleration sensor mounting fixture, and the stud that couples the acceleration sensor and the acceleration sensor mounting fixture together. FIG. 2 illustrates acceleration sensor 10 and stud 50 as viewed along the same direction as in FIG. 1, and acceleration sensor mounting fixture 21 as viewed from the upper side in FIG. 1. With reference to FIG. 2, although FIG. 1 schematically illustrates acceleration sensor 10 (acceleration sensor housing 10B) having a rectangular shape as viewed from the front, acceleration sensor 10, in practice, may have a shape looks like a bolt formed with an external thread, for example. Acceleration sensor 10 has a through hole 10h formed at a central portion of a bottom circular surface in FIG. 2. Acceleration sensor mounting fixture 21 has, for example, a square shape as viewed from above, and has a rectangular parallelepiped shape having a certain thickness in the depth direction of the paper surface of FIG. 2. That is, acceleration sensor mounting fixture 21 may have a plate shape as described later. Acceleration sensor mounting fixture 21 has a through hole 21h formed at a central portion as viewed from above. Although not illustrated, through holes 10h and 21h each have an inner wall formed with an internal thread. Stud 50 has a shape similar to a cylinder, and has an outer surface formed with an external thread.

Figures 3, 4:
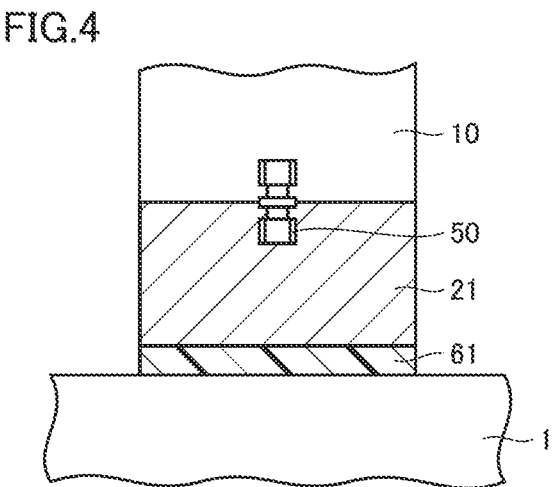
FIG. 3 is a diagram schematically illustrating a process of coupling the acceleration sensor and the acceleration sensor mounting fixture using the stud.
FIG. 4 is an enlarged view schematically illustrating a first example of how the acceleration sensor mounting fixture and an object under measurement are joined together in a region A enclosed by a dotted line in FIG. 1.

FIG. 3 is a diagram schematically illustrating a process of coupling the acceleration sensor and the acceleration sensor mounting fixture using the stud. With reference to FIG. 3, acceleration sensor 10 and acceleration sensor mounting fixture 21 are arranged in alignment with each other as viewed from above so as to make through hole 10h and through hole 21h continuous with each other. Stud 50 is inserted into through holes 10h and 21h. The external thread formed on stud 50 and the internal thread formed on through holes 10h and 21h are tightened together. As a result, acceleration sensor housing 10B, stud 50, and acceleration sensor mounting fixture 21 are coupled to each other. Note that at this time, in order to stabilize frequency response characteristics, tightening torque is adjusted to be, for example, greater than or equal to 2.7 Nm and less than or equal to 6.8 Nm by a torque wrench.

With reference again to FIG. 1, heat shrink tube 31 (tube) is a single tubular covering member that covers both a sensor outer edge 10a that is an outer edge (outer surface) of acceleration sensor housing 10B, and a mounting fixture outer edge 21a that an outer edge (outer surface) of acceleration sensor mounting fixture 21. Sensor outer edge 10a and mounting fixture outer edge 21a are preferably formed so as to be approximately in alignment with each other as viewed from the upper side in FIG. 1 (acceleration sensor 10 and acceleration sensor mounting fixture 21 are approximately equal in shape and size to each other as viewed from above). Heat shrink tube 31 is formed of an insulating material, and is bonded onto sensor outer edge 10a and mounting fixture outer edge 21a by an adhesive 61. Specifically, as heat shrink tube 31, for example, any one of polyolefin, silicone rubber, or polyvinyl chloride is preferably used. Note that, instead of heat shrink tube 31, a tube made of a material having almost no heat shrinkability may be used.

Heat shrink tube 31 may be disposed so as to surround acceleration sensor 10 and acceleration sensor mounting fixture 21 in a tubular shape as illustrated in FIG. 1, for example. As a result, heat shrink tube 31 includes a region protruding outward of acceleration sensor 10 and acceleration sensor mounting fixture 21 as acceleration sensor 10 and acceleration sensor mounting fixture 21 are viewed from above along a direction in which acceleration sensor 10 and acceleration sensor mounting fixture 21 are in alignment with each other (for example, the upper side in FIG. 1). That is, heat shrink tube 31 includes a region protruding outward of sensor outer edge 10a and mounting fixture outer edge 21a as viewed from above as described above. Note that an insulating tape may be used instead of heat shrink tube 31, and this tape may cover and be bonded to sensor outer edge 10a and mounting fixture outer edge 21a in a manner similar to heat shrink tube 31 in FIG. 1. Heat shrink tube 31 covers and is bonded to the surfaces of sensor outer edge 10a and mounting fixture outer edge 21a by adhesive 61, so that a space between sensor outer edge 10a and heat shrink tube 31 and a space between mounting fixture outer edge 21a and heat shrink tube 31 are filled with adhesive 61, and almost no gap is formed. As described above, since almost no gap is formed, the dielectric strength between acceleration sensor 10 and heat shrink tube 31 and between acceleration sensor mounting fixture 21 and heat shrink tube 31 increases.

In FIG. 1, heat shrink tube 31 extends from a center of sensor outer edge 10a in the up-down direction to a center of mounting fixture outer edge 21a in the up-down direction. Heat shrink tube 31, however, may be formed longer in the up-down direction than in FIG. 1, and specifically, heat shrink tube 31 may extend from a position within 25% of a dimension of sensor outer edge 10a in the up-down direction from an upper end of sensor outer edge 10$a$ to a position within 25% of a dimension of mounting fixture outer edge 21$a$ in the up-down direction from a lower end of mounting fixture outer edge 21$a$. Alternatively, heat shrink tube 31 may extend, for example, from a position within 20% of the dimension of sensor outer edge 10$a$ in the up-down direction from the upper end of sensor outer edge 10$a$ to a position within 20% of the dimension of mounting fixture outer edge 21$a$ in the up-down direction from the lower end of mounting fixture outer edge 21$a$. Furthermore, heat shrink tube 31 may be formed in a tubular shape that covers all of sensor outer edge 10$a$, the outer edge of spacer 32, and mounting fixture outer edge 21$a$.

Spacer 32 is disposed so as to be in alignment with acceleration sensor 10 and acceleration sensor mounting fixture 21 as viewed from above, that is, from the upper side in FIG. 1. Spacer 32 is a plate-shaped member formed of an insulating material, for example. Here, the plate-shaped member refers to a member having a shape with dimensions (of a principal surface) in the left-right direction and the depth direction in FIG. 1 greater than or equal to twice a thickness dimension in the up-down direction in FIG. 1, and having a thickness in the up-down direction in FIG. 1 approximately uniform in its entirety (there is no difference larger than or equal to a machining error). That is, the plate shape means a rectangular parallelepiped shape or a cylindrical shape (disk shape) having, for example, a rectangular cross section along the up-down direction in FIG. 1. Spacer 32 is disposed between acceleration sensor housing 10B and acceleration sensor mounting fixture 21 in FIG. 1 so as to be in contact with both a bottom surface of acceleration sensor housing 10B and a top surface of acceleration sensor mounting fixture 21. Note that spacer 32 may have a through hole (cavity) formed at a central portion as viewed from above, or may be a solid member without such a through hole (cavity).

Acceleration sensor cable 40 includes a first cable line 41, a second cable line 42, a shield line 43, and a sheath 44 that ties the lines together in a bundle and surrounds the lines from outside. Note that, in the drawing, first cable line 41 is indicated by a chain line, and second cable line 42 is indicated by a dotted line for easy distinction. In practice, however, such cable lines also extend continuously in a manner similar to shield line 43 indicated by a solid line. First cable line 41 and second cable line 42 are connected to element 11 included in acceleration sensor 10 via an insulating connector 59 provided in contact with acceleration sensor 10. These two cable lines allow the connection of element 11 to a power supply or the application of a voltage to element 11. Shield line 43 has one end not connected to acceleration sensor housing 10B and electrically insulated from acceleration sensor housing 10B. Shield line 43 has the one end connected to insulating connector 59 and has the other end opposite to the one end connected to a ground point G2. Object under measurement 1 is connected to a ground point G1. As a result, object under measurement 1 and acceleration sensor housing 10B are at the ground potential of ground point G1. Note that first cable line 41 and second cable line 42 may each have an end opposite to an end connected to element 11 connected to a data collection device (not illustrated). Further, shield line 43 may have the other end opposite to the one end electrically connected to ground point G2 via the data collection device.

Figure 5:
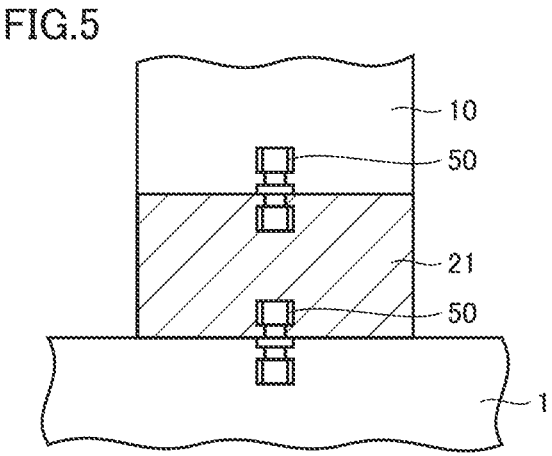
FIG. 5 is an enlarged view schematically illustrating a second example of how the acceleration sensor mounting fixture and the object under measurement are joined together in the region A enclosed by the dotted line in FIG. 1.

FIG. 4 is an enlarged view schematically illustrating a first example of how the acceleration sensor mounting fixture and the object under measurement are joined together in a region A surrounded by a dotted line in FIG. 1. FIG. 5 is an enlarged view schematically illustrating a second example of how the acceleration sensor mounting fixture and the object under measurement are joined together in the region A surrounded by the dotted line in FIG. 1. With reference to FIG. 4, acceleration sensor mounting fixture 21 and object under measurement 1 may be joined together by insulating adhesive 61 that is generally known. Alternatively, with reference to FIG. 5, acceleration sensor mounting fixture 21 and object under measurement 1 may be joined together by insulating stud 50. Any one of FIGS. 4 and 5 may be applied to the joint between the acceleration sensor mounting fixture 21 and object under measurement 1. The same applies to the following embodiments.

(Spacer 32)

Spacer 32 is preferably formed of an insulating material with low water absorption and resistance to deterioration over time. The dielectric strength of spacer 32 is preferably greater than or equal to 10 kV/mm.

Figure 6:
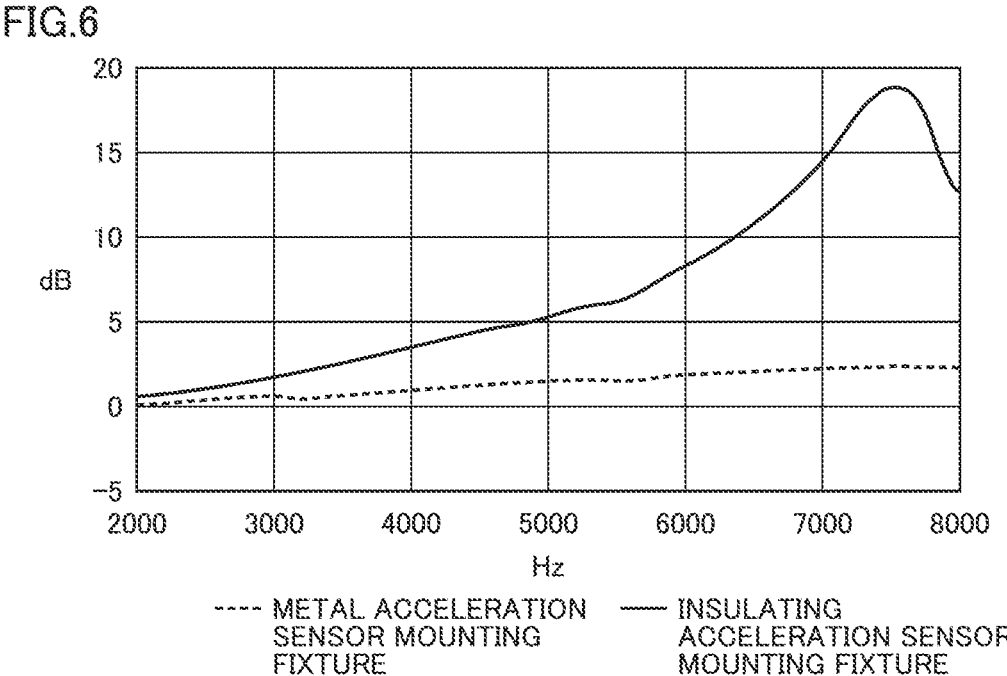
FIG. 6 is a graph showing changes in frequency response characteristics of the acceleration sensor mounting fixture when a material of the acceleration sensor mounting fixture in FIG. 1 is changed.

FIG. 6 is a graph showing changes in frequency response characteristics of the acceleration sensor when the material of the acceleration sensor mounting fixture in FIG. 1 is changed. In FIG. 6, the horizontal axis represents a frequency of vibrations applied to acceleration sensor mounting fixture 21, and the vertical axis represents a gain of an output signal from the acceleration sensor. With reference to FIG. 6, in a case where acceleration sensor mounting fixture 21 is made of a material having a high Young's modulus (for example, SUS304) such as metal (conductor), the gain does not increase so much even when the frequency increases, and there is no frequency at which so-called resonance that makes the gain become extremely high occurs in a frequency band of less than or equal to at least 8000 Hz. Therefore, in a case where acceleration sensor mounting fixture 21 is made of a material having a high Young's modulus such as metal (conductor), the frequency response characteristics become satisfactory. On the other hand, in a case where acceleration sensor mounting fixture 21 is made of a material having a relatively low Young's modulus such as a resin material (insulator), specifically, polyetheretherketone (PEEK), the gain increases as the frequency increases, and resonance occurs at a frequency of about 7500 Hz. Therefore, if a material having a relatively low Young's modulus such as a resin material (insulator) is sandwiched between element 11 that senses vibrations and object under measurement 1, the frequency response characteristics in a high frequency band become poor.

Figure 7:
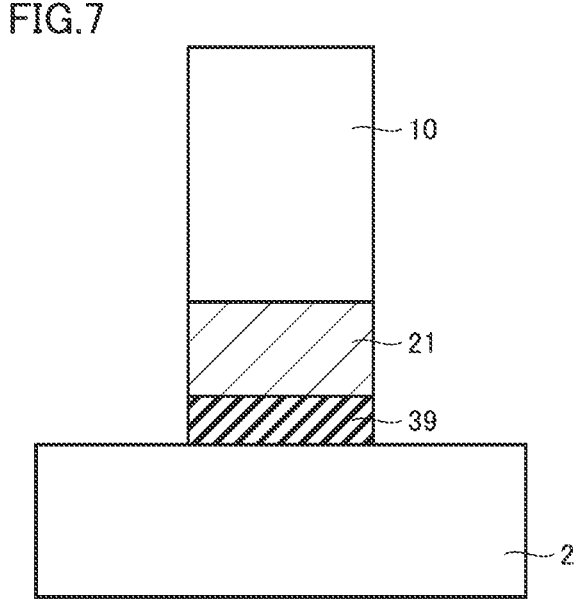
FIG. 7 is a schematic diagram of a configuration prepared for determining a spring constant of a spacer.

However, even in a case where spacer 32 is made of a material having a low Young's modulus such as resin (insulator), if the optimum spring constant of spacer 32 is greater than or equal to $2.0 \times 10^9$ N/m, the high frequency response characteristics in the high frequency band can be made satisfactory. This will be described below. The numerical range of the spring constant of spacer 32 is determined as follows. FIG. 7 is a schematic diagram of a configuration prepared for determining the spring constant of the spacer. With reference to FIG. 7, acceleration sensor 10 and acceleration sensor mounting fixture 21 given here are the same as acceleration sensor 10 and acceleration sensor mounting fixture 21 in FIG. 1. Acceleration sensor mounting fixture 21 is disposed on a side (lower side) of acceleration sensor 10 adjacent to vibration excitation table 2. Vibration excitation table 2 corresponds to object under measurement 1 in FIG. 1. An insulating plate 39 corresponds to spacer 32 in FIG. 1. Note that insulating plate 39 is disposed not between acceleration sensor 10 and acceleration sensor mounting fixture 21 but between acceleration sensor mounting fixture 21 and vibration excitation table 2 (on a lower side of acceleration sensor mounting fixture 21). Note that acceleration sensor cable 40 and ground points G1 and G2 are not illustrated. Insulating plate 39 is formed of PEEK and has a Young's modulus of 3.6 GPa. Three types of insulating plates 39 shown in the following Table 1 were used, insulating plates 39 each having a plate shape (rectangular parallelepiped shape) and an area of 400 mm², and having thicknesses different from each other, and frequency response characteristics when using each insulating plate 39 were checked.

TABLE 1

| Shape | Spring constant (N/m) |
| --- | --- |
| 20 mm × 20 mm × 1 mm | $1.44 \times 10^9$ |
| 20 mm × 20 mm × 2 mm | $0.72 \times 10^9$ |
| 20 mm × 20 mm × 10 mm | $0.144 \times 10^9$ |

Figure 8:
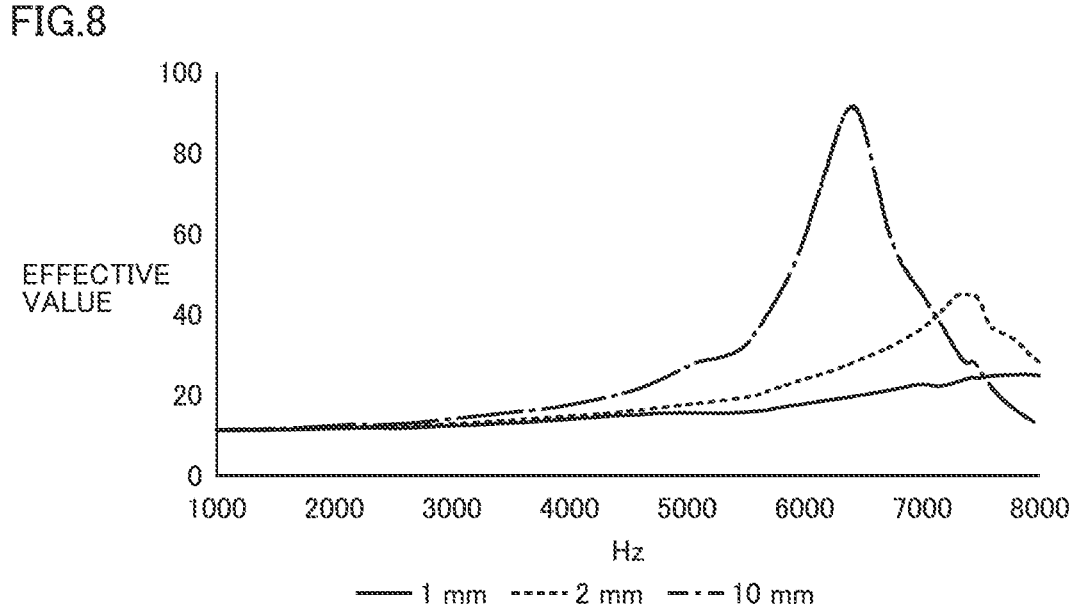
FIG. 8 is a graph showing changes in frequency response characteristics of an insulating plate when a thickness of the insulating plate is changed using the configuration in FIG. 7.

FIG. 8 is a graph showing changes in frequency response characteristics of the insulating plate when the thickness of the insulating plate is changed using the configuration in FIG. 7. In FIG. 8, the horizontal axis represents a frequency of vibrations applied to insulating plate 39, and the vertical axis represents an effective value of an output signal. With reference to FIG. 8, in a case where insulating plate 39 having a thickness of 2 mm and insulating plates 39 having a thickness of 10 mm are used, resonance occurs at frequencies of about 7300 Hz and about 6300 Hz, respectively. Generally speaking, a frequency range in which a resonance point is observed is not suitable for vibration measurement. Therefore, neither insulating plate 39 having a thickness of 2 mm nor insulating plate 39 having a thickness of 10 mm can be used for vibration measurement in a high-frequency band. On the other hand, insulating plate 39 having a thickness of 1 mm can be used for vibration measurement in a high frequency band because no resonance point appears in a frequency band of less than or equal to 8000 Hz. Therefore, insulating plate 39 having a small thickness, that is, a high spring constant has a high resonance point. From Table 1, it is required that the spring constant of insulating plate 39 having a thickness of 1 mm be $1.44 \times 10^9$ N/m. Note that it is more preferable that the magnitude of the spring constant have a little upward margin. From this perspective, as described above, the spring constant of spacer 32 is preferably greater than or equal to $2.0 \times 10^9$ N/m.

Spacer 32 may be a resin material having a high Young's modulus, that is, a Young's modulus of greater than or equal to 2.5 GPa. Herein, the resin material may contain at least one of carbon fibers or glass fibers. Alternatively, spacer 32 may be made of a ceramic material containing at least one of silicon, aluminum, or alkaline earth metal and having a high Young's modulus, that is, a Young's modulus of greater than or equal to 100 GPa. Further, the thickness of spacer 32 in the up-down direction in FIG. 1 is preferably less than 2 mm.

Comparative Example and Problem Therewith

Figure 9:
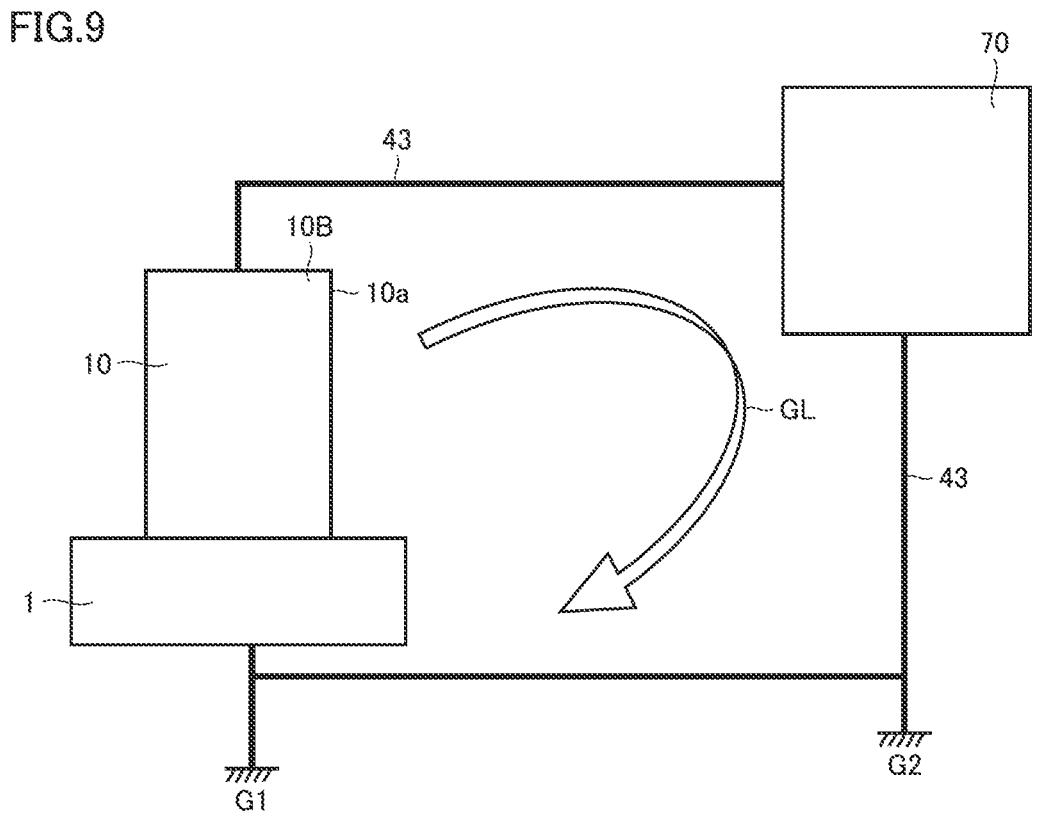
FIG. 9 is a schematic diagram for describing a ground loop that occurs in a vibration measurement device according to a comparative example.

FIG. 9 is a schematic diagram for describing a ground loop that occurs in a vibration measurement device according to a comparative example. With reference to FIG. 9, the vibration measurement device of the comparative example includes acceleration sensor 10 and shield line 43. The vibration measurement device may further include a data collection device 70. In FIG. 9, no insulating member is interposed between acceleration sensor 10 and object under measurement 1. In FIG. 9, in a case where the ground potential is different between ground point G1 connected to object under measurement 1 and ground point G2 connected to data collection device 70, a current indicated by an arrow in the drawing flows between ground point G1 and ground point G2, and noise of the current may be added to a signal measured by the vibration measurement device. This noise current circulates in a circuit including a circuit between ground point G1 and ground point G2 in FIG. 9. Such a phenomenon is called a ground loop GL. If noise is added to the signal measured by the vibration measurement device, data obtained as a result of measurement will become less reliable.

Figure 10:
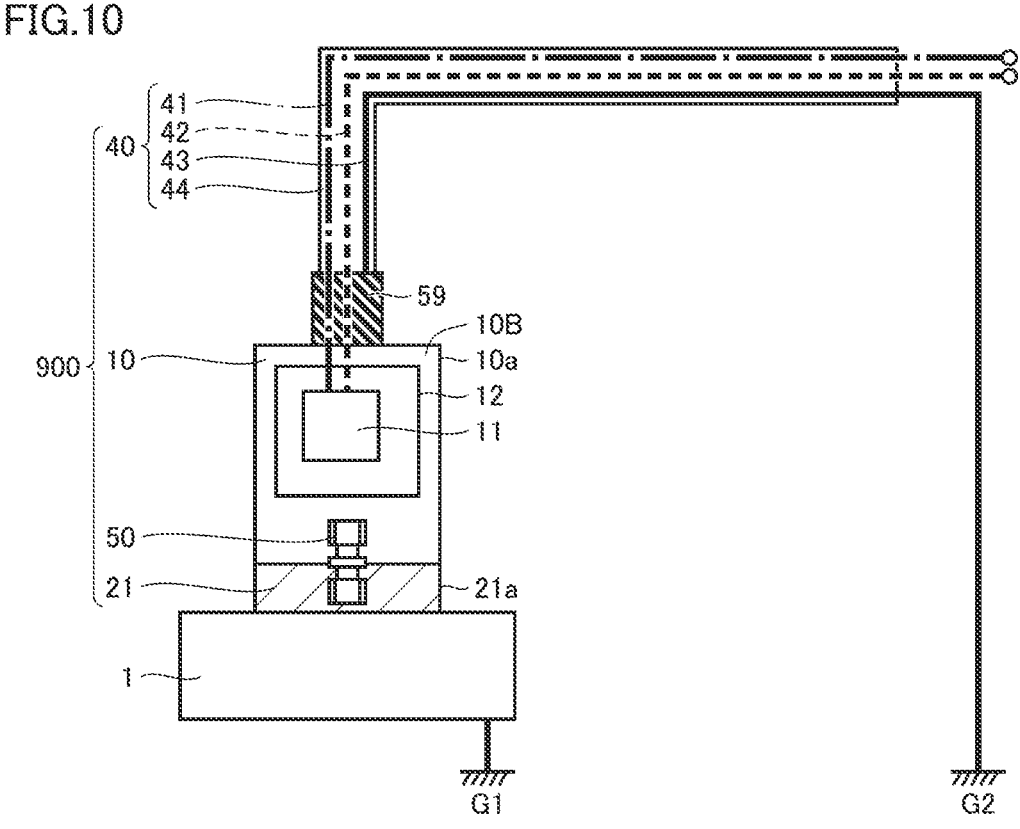
FIG. 10 is a diagram schematically illustrating a configuration of a vibration measurement device according to a first example of the comparative example for preventing a ground loop.

FIG. 10 is a diagram schematically illustrating a configuration of a vibration measurement device according to a first example of the comparative example for preventing a ground loop. With reference to FIG. 10, a vibration measurement device 900 according to the first example of the comparative example is different from vibration measurement device 100 in FIG. 1 in the following points. In vibration measurement device 900, insulating spacer 32 is not sandwiched between acceleration sensor 10 and acceleration sensor mounting fixture 21. Further, in FIG. 10, heat shrink tube 31 covering sensor outer edge 10a and mounting fixture outer edge 21a is not provided.

In FIG. 10, however, insulating connector 59 is attached to a side of acceleration sensor 10, remote from object under measurement 1 as in FIG. 1. First cable line 41 and second cable line 42 connected to element 11 pass through insulating connector 59 and sheath 44. Shield line 43 has one end connected to insulating connector 59 and not connected to the conductive housing of acceleration sensor 10. Therefore, in vibration measurement device 900, acceleration sensor 10 and shield line 43 are not electrically connected. Therefore, in FIG. 10, even if the ground potential is different between ground point G1 and ground point G2, ground loop GL as in FIG. 9 does not occur.

Figure 11:
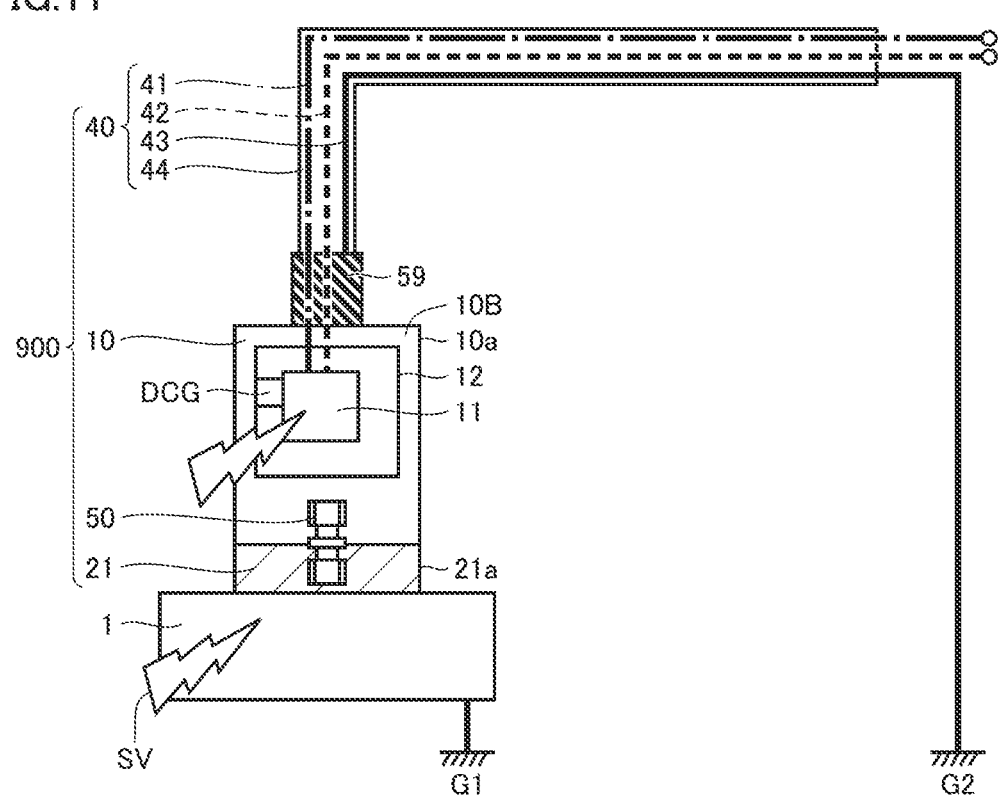
FIG. 11 is a schematic diagram for describing discharge accompanying a surge voltage applied to the vibration measurement device according to the first example of the comparative example in FIG. 10.

FIG. 11 is a schematic diagram for describing discharge accompanying a surge voltage applied to the vibration measurement device according to the first example of the comparative example in FIG. 10. With reference to FIG. 11, in a case where a high voltage referred to as surge voltage SV caused by a lightning strike or the like is applied to object under measurement 1 in FIG. 10, the high voltage is also applied to acceleration sensor housing 10B electrically connected with object under measurement 1. As a result, the high voltage is applied between element 11 in acceleration sensor 10 and acceleration sensor housing 10B in which cavity 12 accommodating element 11 is formed, and discharge DCG occurs accordingly. This discharge DCG may cause burn-damage or damage to element 11 and cause a failure of acceleration sensor 10.

Figure 12:
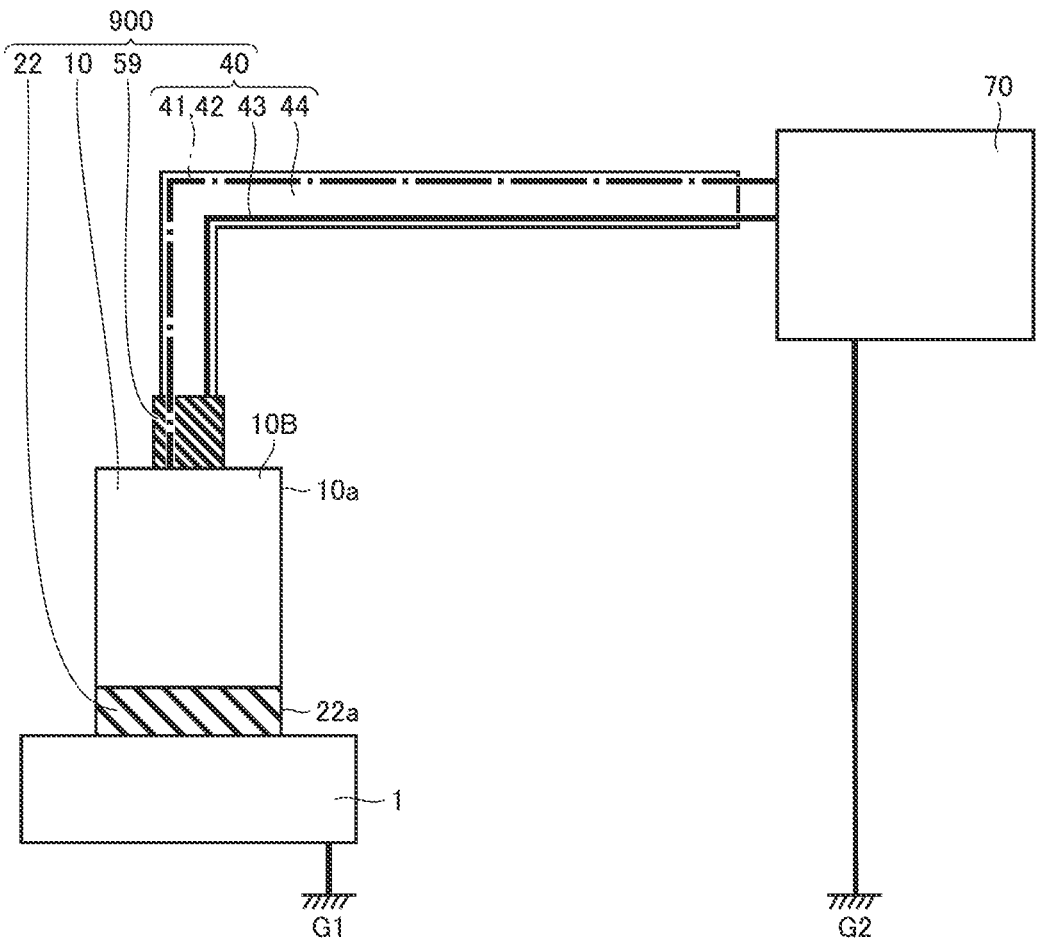
FIG. 12 is a diagram schematically illustrating a configuration of a vibration measurement device according to a second example of the comparative example for preventing a ground loop.

FIG. 12 is a diagram schematically illustrating a configuration of a vibration measurement device according to a second example of the comparative example for preventing a ground loop. With reference to FIG. 12, a vibration measurement device 900 according to the second example of the comparative example is different from vibration measurement device 100 in FIG. 1 in the following points. Vibration measurement device 900 includes an acceleration sensor mounting fixture 22 instead of acceleration sensor mounting fixture 21 on a side of acceleration sensor 10, adjacent to object under measurement 1. Acceleration sensor mounting fixture 22 has its housing made of, for example, an insulating material. Therefore, acceleration sensor 10 and object under measurement 1 are electrically insulated from each other under normal conditions. However, in a case where a surge voltage is applied to object under measurement 1 in FIG. 12, there is a possibility that the high voltage is transmitted from acceleration sensor mounting fixture 22 to acceleration sensor 10 to cause discharge DCG, and acceleration sensor 10 fails accordingly as in FIG. 11. This is because a creepage distance from object under measurement 1 to acceleration sensor 10 in FIG. 12, the creepage distance extending in the up-down direction along left and right side surfaces in FIG. 12 is relatively short, so that discharge occurs in air. Even if insulating acceleration sensor mounting fixture 22 is interposed, a surge voltage may be transmitted from object under measurement 1 to acceleration sensor 10 through insulating acceleration sensor mounting fixture 22. The problem is to reduce the possibility of a failure of element 11 and acceleration sensor 10 due to discharge caused by a lightning strike or the like. Note that, from the viewpoint of facilitating detection of a vibration signal in the first place, the acceleration sensor mounting fixture is preferably conductive rather than insulating.

(Action and Effect)

In view of the above-described problems, vibration measurement device 100 according to the present embodiment includes acceleration sensor 10, acceleration sensor mounting fixture 21, spacer 32 as an insulating member, and acceleration sensor cable 40. Acceleration sensor 10 includes element 11 capable of measuring vibrations of the object under measurement. Acceleration sensor mounting fixture 21 is disposed on a side (lower side in FIG. 1) of acceleration sensor 10 adjacent to a position where object under measurement 1 is to be disposed. Spacer 32 is sandwiched between acceleration sensor 10 and the position where object under measurement 1 is to be disposed. Acceleration sensor cable 40 includes the pair of cable lines (first cable line 41 and second cable line 42), shield line 43, and sheath 44 that ties first cable line 41, second cable line 42, and shield line 43 together in a bundle and surrounds the lines from outside.

Even if the housing of acceleration sensor mounting fixture 21 is formed of a conductive material such as metal, it is possible to achieve, by spacer 32 disposed as an insulating member, insulation between acceleration sensor 10 and object under measurement 1. This is true under normal conditions and under application of a surge voltage to object under measurement 1. Therefore, the dielectric strength of vibration measurement device 100 is improved as compared with a case where no spacer 32 is provided, and acceleration sensor 10 becomes less prone to failure. Further, since acceleration sensor mounting fixture 21 can be made conductive by spacer 32, it is possible to suppress a decrease in accuracy of vibration measurement made by vibration measurement device 100.

In vibration measurement device 100 described above, single insulating heat shrink tube 31 covers sensor outer edge 10a of acceleration sensor 10 and mounting fixture outer edge 21a of acceleration sensor mounting fixture 21. Heat shrink tube 31 includes a region protruding outward (covering the outer periphery) of acceleration sensor 10 and acceleration sensor mounting fixture 21 as viewed from above along a direction in which acceleration sensor 10 and acceleration sensor mounting fixture 21 are in alignment with each other.

From a different perspective, vibration measurement device 100 according to the present embodiment includes acceleration sensor 10, acceleration sensor mounting fixture 21, spacer 32 as an insulating member, and the single insulating tube (heat shrink tube 31). Acceleration sensor 10 includes element 11 capable of measuring vibrations of object under measurement 1. Acceleration sensor mounting fixture 21 is disposed on a side of acceleration sensor 10, adjacent to object under measurement 1. Spacer 32 is sandwiched between acceleration sensor 10 and acceleration sensor mounting fixture 21 and is in contact with both acceleration sensor 10 and acceleration sensor mounting fixture 21. Single insulating heat shrink tube 31 covers sensor outer edge 10a of acceleration sensor 10 and mounting fixture outer edge 21a of acceleration sensor mounting fixture 21. Heat shrink tube 31 includes a region protruding outward (covering the outer periphery) of acceleration sensor 10 and acceleration sensor mounting fixture 21 as viewed from above along a direction in which acceleration sensor 10 and acceleration sensor mounting fixture 21 are in alignment with each other.

Next, heat shrink tube 31 covers the outer peripheries of acceleration sensor 10 and acceleration sensor mounting fixture 21 (sensor outer edge 10a and mounting fixture outer edge 21a), so that the creepage distance can be increased in the up-down direction in FIG. 1. In a configuration where sensor outer edge 10a and mounting fixture outer edge 21a are not covered with heat shrink tube 31, insulation between acceleration sensor mounting fixture 21 and acceleration sensor housing 10B is achieved by spacer 32. That is, the creepage distance is the thickness of spacer 32. In FIG. 1, the creepage distance between acceleration sensor 10 and acceleration sensor mounting fixture 21, however, is a creepage distance 63 indicated by an arrow in the drawing. Specifically, creepage distance 63 corresponds to a distance of movement along the outermost edge from acceleration sensor 10 to acceleration sensor mounting fixture 21. That is, for example, in a case where heat shrink tube 31 is present between acceleration sensor 10 and acceleration sensor mounting fixture 21, creepage distance 63 is measured as a distance of movement along the surface of heat shrink tube 31. Therefore, as compared with a case where no heat shrink tube 31 is provided, it is possible to suppress, when a surge voltage is applied to object under measurement 1, the application of a high voltage to element 11, the generation of a high current, and the occurrence of discharge to acceleration sensor 10. This is because longer creepage distance 63 can suppress creepage discharge via sensor outer edge 10a or the like. It is therefore possible to reduce the possibility of a failure of element 11 and a failure of acceleration sensor 10.

Further, in the present embodiment, it is possible to control the spring constant by controlling the dimensions of spacer 32 as an insulating member according to the material of spacer 32. This allows spacer 32 to have satisfactory frequency response characteristics in a high frequency band. It is therefore possible to suppress a decrease in accuracy of vibration measurement made by vibration measurement device 100 including spacer 32.

The present embodiment prevents a failure of acceleration sensor 10. Therefore, the frequency of occurrence of measurement trouble in the vibration measurement device is reduced, and a device for monitoring the vibration measurement device is improved in reliability. This action and effect are basically the same as in each embodiment described below.

Second Embodiment (Configuration of Vibration Measurement Device)

Figure 13:
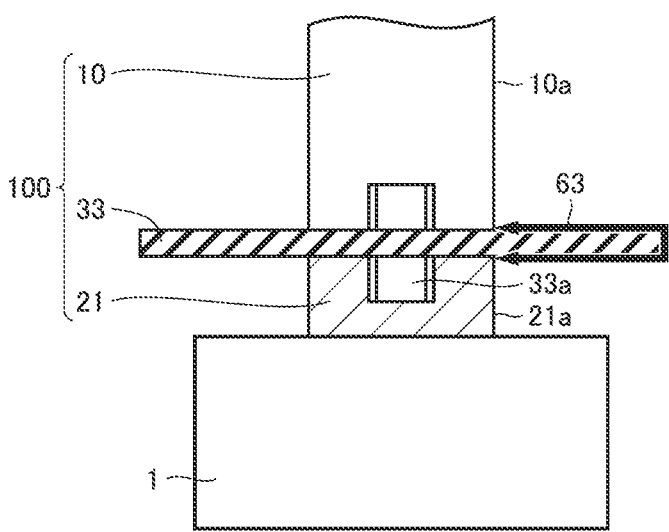
FIG. 13 is a diagram schematically illustrating a configuration of a vibration measurement device according to a second embodiment.

FIG. 13 is a diagram schematically illustrating a configuration of a vibration measurement device according to a second embodiment. Note that FIG. 13 corresponds to FIG.

1. Note that, in the second to tenth embodiments, acceleration sensor cable 40 and ground points G1 and G2 in FIG. 1 actually exist as in FIG. 1, but illustration thereof will be omitted.

With reference to FIG. 13, vibration measurement device 100 according to the present embodiment is basically identical in configuration to vibration measurement device 100 illustrated in FIG. 1, so that the same description will not be repeated. Vibration measurement device 100 of the present embodiment, however, does not include heat shrink tube 31. Further, in vibration measurement device 100 of the present embodiment, an adapter 33 is disposed as an insulating member instead of spacer 32. For example, adapter 33 has a circular shape as acceleration sensor 10 and acceleration sensor mounting fixture are viewed from above along a direction in which acceleration sensor and acceleration sensor mounting fixture 21 are in alignment with each other (for example, the upper side in FIG. 13), and has a thickness in the up-down direction in FIG. 13 approximately uniform in its entirety (there is no difference larger than or equal to a machining error). The planar shape of adapter 33, however, is not limited to a circular shape, and may be, for example, an elliptical planar shape, a rectangular planar shape, or a square planar shape. Adapter 33 may be disposed so as to be sandwiched between acceleration sensor mounting fixture 21 and object under measurement 1 and to be in contact with both acceleration sensor mounting fixture 21 and object under measurement 1.

Adapter 33 includes a region protruding outward of acceleration sensor 10 and acceleration sensor mounting fixture 21 as acceleration sensor 10 and acceleration sensor mounting fixture 21 are viewed from above along a direction in which acceleration sensor 10 and acceleration sensor mounting fixture 21 are in alignment with each other (for example, the upper side in FIG. 1). That is, adapter 33 includes a region protruding outward of sensor outer edge 10*a* and mounting fixture outer edge 21*a* as viewed from above as described above. The part of adapter 33 protruding outward of sensor outer edge 10*a* and mounting fixture outer edge 21*a* as viewed from above increases creepage distance 63 between acceleration sensor 10 and acceleration sensor mounting fixture 21 as compared with a case where adapter 33 does not have such a protruding part. Creepage distance 63 between acceleration sensor 10 and acceleration sensor mounting fixture 21 is approximately equal to the sum of a value twice a length of an outer edge of adapter 33 protruding in the horizontal direction relative to sensor outer edge 10*a* and a value of the thickness of adapter 33 in the up-down direction in FIG. 13.

The length of the part of adapter 33 protruding outward of sensor outer edge 10*a* and mounting fixture outer edge 21*a* in the horizontal direction as viewed from above is set to a length at which the dielectric breakdown voltage of air under normal conditions having the same thickness as creepage distance 63 between acceleration sensor 10 and acceleration sensor mounting fixture 21 (via adapter 33) obtained by the horizontal length is greater than or equal to 100 kV. Here, air under normal conditions is air having a temperature of 23° C. and a humidity of 50%. More specifically, it is preferable that the diameter (maximum dimension) of adapter 33 in the horizontal direction (left-right direction in FIG. 13) be, for example, greater than or equal to twice and less than or equal to three times the dimension of the housing of acceleration sensor 10 and the dimension of acceleration sensor mounting fixture 21 in the horizontal direction.

The spring constant of adapter 33 is preferably equal to the spring constant of insulating plate 39 of the first embodiment. That is, the spring constant of adapter 33 is preferably, for example, greater than or equal to $2.0 \times 10^9$ N/m.

Further, adapter 33 includes an adapter protrusion 33*a* that fits into both acceleration sensor 10 and acceleration sensor mounting fixture 21 on one (upper side in FIG. 13) surface and the other (lower side in FIG. 13) surface of the plate-shaped member protruding outward of sensor outer edge 10*a* of acceleration sensor 10 and the like as described above. Adapter protrusion 33*a* is preferably formed of the same material as the plate-shaped member of adapter 33 (that is, an insulating material). A recess portion into which adapter protrusion 33*a* fits is formed in the surface of each of the housings of acceleration sensor 10 and acceleration sensor mounting fixture 21. When adapter protrusion 33*a* is inserted into the recess portion, adapter protrusion 33*a* is fixed to acceleration sensor 10 and acceleration sensor mounting fixture 21. Therefore, adapter 33 is fixed in its entirety to acceleration sensor 10 and acceleration sensor mounting fixture 21. The shape of adapter protrusion 33*a* as viewed from above (shape as viewed along the up-down direction in FIG. 13) may be any one of a circle, an ellipse, a rectangle, or a square. In the up-down direction in FIG. 13 (direction in which acceleration sensor 10 and acceleration sensor mounting fixture 21 are connected to each other), adapter protrusion 33*a* may be thicker than an adapter 33, or may be thinner than or identical in thickness to adapter 33. Acceleration sensor 10 and acceleration sensor mounting fixture 21 are coupled to each other by adapter 33 including adapter protrusion 33*a*.

(Action and Effect)

In vibration measurement device 100 described above, the insulating member (adapter 33) includes a region protruding outward of acceleration sensor 10 and acceleration sensor mounting fixture 21 as viewed from above along a direction in which acceleration sensor 10 and acceleration sensor mounting fixture 21 are in alignment with each other.

From a different perspective, vibration measurement device 100 according to the present embodiment includes acceleration sensor 10, acceleration sensor mounting fixture 21, and the insulating member (adapter 33). Acceleration sensor 10 includes element 11 capable of measuring vibrations of object under measurement 1. Acceleration sensor mounting fixture 21 is disposed on a side of acceleration sensor 10, adjacent to object under measurement 1. The insulating member (adapter 33) is sandwiched between acceleration sensor 10 and acceleration sensor mounting fixture 21 and is in contact with both acceleration sensor 10 and acceleration sensor mounting fixture 21. The insulating member (adapter 33) includes a region protruding outward of acceleration sensor 10 and acceleration sensor mounting fixture 21 as viewed from above along a direction in which acceleration sensor 10 and acceleration sensor mounting fixture 21 are in alignment with each other. Creepage distance 63 can be increased by adapter 33 protruding outward of acceleration sensor 10 and the like as viewed from above in a manner similar to heat shrink tube 31 of the first embodiment, so that it is possible to reduce the possibility of a failure of element 11 and a failure of acceleration sensor 10 when a surge voltage is applied to object under measurement 1. The other actions and effects are the same as those of the first embodiment, so that the description thereof will not be repeated.

Third Embodiment (Configuration of Vibration Measurement Device)

Figures 14, 15:
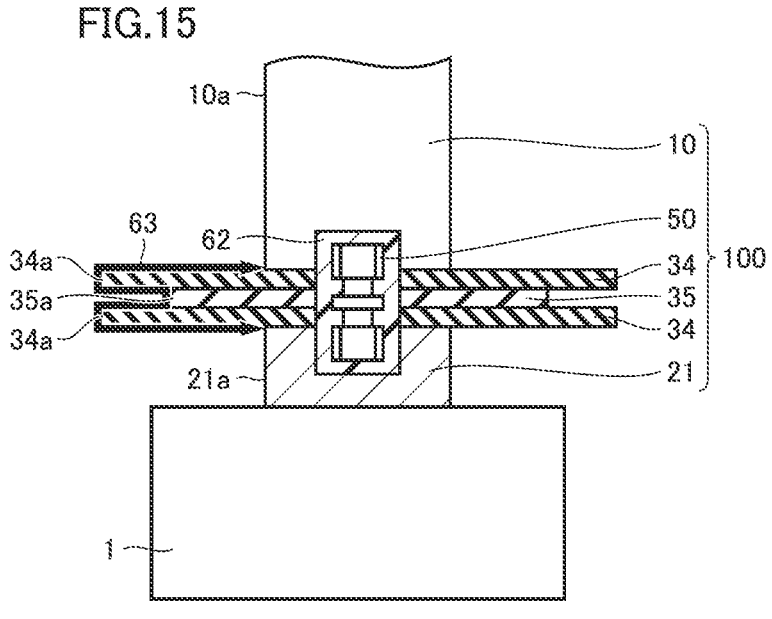
FIG. 14 is a diagram schematically illustrating a configuration of a vibration measurement device according to a third embodiment.
FIG. 15 is a diagram schematically illustrating a configuration of a vibration measurement device according to a fourth embodiment.

FIG. 14 is a diagram schematically illustrating a configuration of a vibration measurement device according to a third embodiment. Note that FIG. 14 corresponds to FIGS. 1 and 13. With reference to FIG. 14, vibration measurement device 100 according to the present embodiment is basically identical in configuration to vibration measurement devices 100 illustrated in FIGS. 1 and 13, so that the same description will not be repeated. Vibration measurement device 100 of the present embodiment, however, does not include heat shrink tube 31. Further, in vibration measurement device 100 of the present embodiment, a single insulating spacer 34 is disposed as an insulating member instead of spacer 32 and adapter 33. Spacer 34 is disposed at the same position as the position of spacer 32 and adapter 33. Spacer 34 may be identical in material and the like to spacer 32 of the first embodiment. As with adapter 33, spacer 34, however, includes a region protruding outward of acceleration sensor 10 and acceleration sensor mounting fixture 21 when acceleration sensor 10 and acceleration sensor mounting fixture 21 are viewed from above along a direction in which acceleration sensor 10 and acceleration sensor mounting fixture 21 are in alignment with each other (for example, the upper side in FIG. 1). In this respect, spacer 34 is different from spacer 32 having an area approximately equal to the area of acceleration sensor 10 and the area of acceleration sensor mounting fixture 21 as viewed from above (not protruding outward of sensor outer edge 10a and the like as viewed from above). Also in the present embodiment, the region of spacer 34 protruding outward of acceleration sensor 10 and the like allows an increase in creepage distance 63 as in the second embodiment. Spacer 34 is preferably identical in spring constant to insulating plate 39 of the first embodiment and adapter 33 of the second embodiment. For this reason, the length of spacer 34 protruding outward of acceleration sensor 10 and acceleration sensor mounting fixture 21 as viewed from above and the thickness of spacer 34 in the up-down direction in FIG. 14 may be approximately equal to the length of the protrusion of adapter 33 and the thickness of adapter 33, respectively.

(Action and Effect)

In vibration measurement device 100 described above, the insulating member may be single insulating spacer 34. Acceleration sensor 10 and acceleration sensor mounting fixture 21 are coupled to each other by the insulating fixing member (stud 50), and filler 62 may be disposed in a gap between stud 50, and acceleration sensor 10 and acceleration sensor mounting fixture 21. Also with this configuration, creepage distance 63 can be increased by spacer 34 protruding outward of acceleration sensor 10 and the like as viewed from above, and the possibility of a failure of element 11 and a failure of acceleration sensor 10 when a surge voltage is applied to object under measurement 1 can be reduced.

Fourth Embodiment (Configuration of Vibration Measurement Device)

FIG. 15 is a diagram schematically illustrating a configuration of a vibration measurement device according to a fourth embodiment. Note that FIG. 15 corresponds to FIG. 14. With reference to FIG. 15, vibration measurement device 100 according to the present embodiment is basically identical in configuration to vibration measurement device 100 illustrated in FIG. 14, so that the same description will not be repeated. In vibration measurement device 100 in FIG.

15, a total of three spacers including two spacers 34 and one spacer 35 are arranged as insulating members. Spacer 35 is sandwiched between upper spacer 34 and lower spacer 34, and spacer 34, spacer 35, and spacer 34 laminated in this order from the lower side to the upper side are sandwiched between acceleration sensor 10 and acceleration sensor mounting fixture 21. Spacer 35 may be identical in material to spacer 34. When the three spacers thus laminated is considered as a single unit spacer, it can be said that the single unit spacer is in contact with both acceleration sensor 10 and acceleration sensor mounting fixture 21 with the uppermost portion in contact with acceleration sensor 10 and the lowermost portion in contact with acceleration sensor mounting fixture 21.

Spacer 35 is formed of the same material as the material of spacer 34, but is shorter in dimension in the horizontal direction (left-right direction in FIG. 15) than spacer 34. The dimension of spacer 34 in the horizontal direction may be greater than or equal to 0.5 times and less than or equal to 0.8 times the dimension of spacer 35 in the horizontal direction, and is preferably greater than or equal to 0.6 times and less than or equal to 0.7 times. As a result, a spacer outer edge 35a of spacer 35 is disposed inside a spacer outer edge 34a of spacer 34, that is, at a position adjacent to a center of acceleration sensor 10 in a radial direction extending radially from the center as viewed from above. As with spacer 34, spacer outer edge 35a of spacer 35, however, is disposed outside sensor outer edge 10a and mounting fixture outer edge 21a as viewed from above (at a position remote from the center of acceleration sensor 10 relative to spacer outer edge 34a in the radial direction). Note that three spacers 34 and 35 thus laminated are collectively coupled and fixed to acceleration sensor 10 and acceleration sensor mounting fixture 21 by stud 50.

In FIG. 15, spacer 34, spacer 35, and spacer 34 are laminated in this order from the lower side to the upper side, but the present disclosure is not limited to such a configuration, and for example, two spacers 35 and one spacer 34 may be laminated in the order of spacer 35, spacer 34, and spacer 35. Alternatively, two spacers 34 and two spacers 35 may be alternately laminated, or may be laminated such that any one of spacers 34 and 35 is disposed as the lowermost layer. The number of spacers 34 and 35 to be arranged and the order of spacers 34 and 35 are determined as desired.

(Action and Effect)

Vibration measurement device 100 according to the present embodiment includes acceleration sensor 10, acceleration sensor mounting fixture 21, and at least one spacer 34 and at least one spacer 35 as insulating members. Spacers 34 and 35 each include a region protruding outward of acceleration sensor 10 and acceleration sensor mounting fixture 21 as viewed from above along a direction in which acceleration sensor 10 and acceleration sensor mounting fixture 21 are in alignment with each other. Spacer 35 is smaller than spacer 34 in dimension in a direction (left-right direction in FIG. 15) intersecting a direction (up-down direction in FIG. 15) in which acceleration sensor 10 and acceleration sensor mounting fixture 21 are connected to each other. Spacers 34 and 35 laminated together are sandwiched between acceleration sensor 10 and acceleration sensor mounting fixture 21 and are in contact with both acceleration sensor 10 and acceleration sensor mounting fixture 21. As a result, for example, creepage distance 63 of the protrusion and depression shape in the left-right direction in FIG. 15 is obtained by two spacer outer edges 34a and one spacer outer edge 35a in FIG. 15. That is, spacer outer edge 34a and spacer outer edge 35a are different in dimension in the horizontal direction, so that creepage distance 63 from acceleration sensor 10 to acceleration sensor mounting fixture 21 along the outer edge of the laminated structure of spacer outer edge 34a and spacer outer edge 35a is increased by the difference. It is therefore possible to reduce the possibility of a failure of element 11 and a failure of acceleration sensor 10 when a surge voltage is applied to object under measurement 1. The other actions and effects are the same as those of the first embodiment, so that the description thereof will not be repeated.

Fifth Embodiment (Configuration of Vibration Measurement Device)

Figures 16, 17:
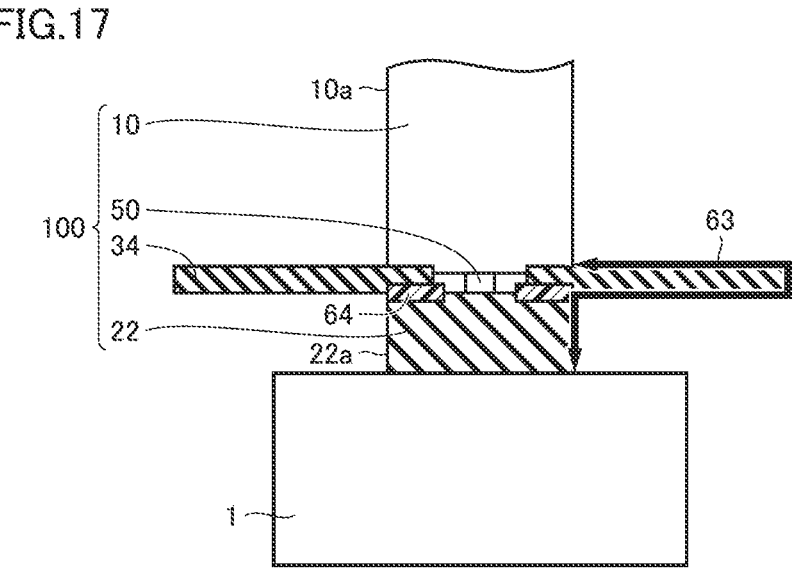
FIG. 16 is a diagram schematically illustrating a configuration of a vibration measurement device according to a fifth embodiment.
FIG. 17 is a diagram schematically illustrating a configuration of a vibration measurement device according to a sixth embodiment.

FIG. 16 is a diagram schematically illustrating a configuration of a vibration measurement device according to a fifth embodiment. Note that FIG. 16 corresponds to FIG. 1. With reference to FIG. 16, vibration measurement device 100 according to the present embodiment is basically identical in configuration to vibration measurement device 100 illustrated in FIG. 1, so that the same description will not be repeated. In vibration measurement device 100 in FIG. 16, acceleration sensor mounting fixture 22 whose housing is made of an insulating material is disposed instead of acceleration sensor mounting fixture 21 whose housing is made of a conductive material. The insulating material constituting the housing of acceleration sensor mounting fixture 22 is preferably a material with low water absorption and resistance to deterioration over time. Further, the dielectric strength of acceleration sensor mounting fixture 22 is preferably greater than or equal to 10 kV/mm. Specifically, the insulating material constituting the housing of acceleration sensor mounting fixture 22 may be the same as the insulating material constituting spacer 32 in the first embodiment. In the present embodiment, since acceleration sensor mounting fixture 22 has the insulating housing, none of spacers 32 and 34, and adapter 33 as an insulating member is disposed.

In FIG. 16, no filler is disposed in a gap between stud 50, and acceleration sensor 10 and acceleration sensor mounting fixture 22 to which stud 50 is coupled. This is because, since acceleration sensor mounting fixture 22 has an insulating property, it is possible to make stud 50 and the surrounding area of stud 50 high in dielectric strength even without a filler. In FIG. 16, filler 62, however, may be disposed in the gap between stud 50, and acceleration sensor 10 and acceleration sensor mounting fixture 22 to which stud 50 is coupled as in FIG. 1.

Figure 26:
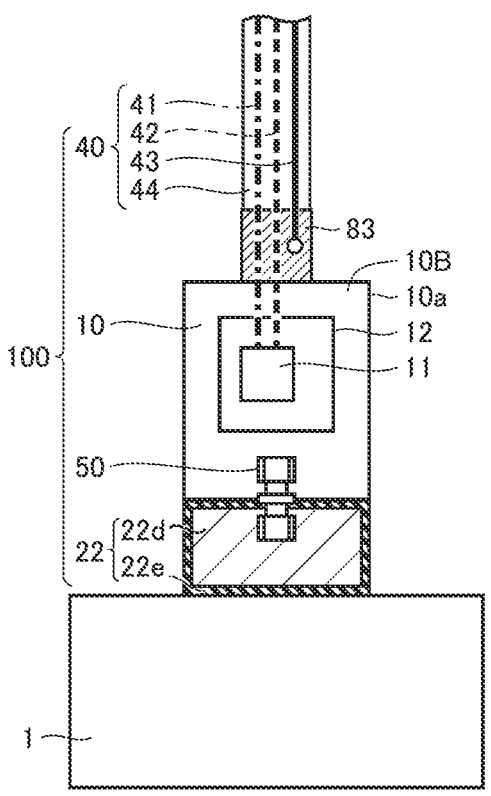
FIG. 26 is a diagram schematically illustrating a configuration of a vibration measurement device according to a thirteenth embodiment.

Note that the housing of acceleration sensor mounting fixture 22 of the present embodiment may be made (in its entirety) of an insulating material as described above. However, as illustrated in FIG. 26 to be described later, for example, acceleration sensor mounting fixture 22 of the present embodiment may have a main body of the housing made of a conductive material, and a surface of the main body may be coated (applied) with a thin film of an insulating material. In any case, acceleration sensor mounting fixture 22 can electrically insulate between acceleration sensor 10 and object under measurement 1.

(Action and Effect)

Vibration measurement device 100 according to the present embodiment includes acceleration sensor 10, acceleration sensor mounting fixture 22, and the single insulating tube (heat shrink tube 31). Acceleration sensor 10 includes element 11 capable of measuring vibrations of object under measurement 1. Acceleration sensor mounting fixture 22 is disposed on a side of acceleration sensor 10, adjacent to object under measurement 1. Single insulating heat shrink tube 31 covers sensor outer edge 10a of acceleration sensor 10 and mounting fixture outer edge 22a of acceleration sensor mounting fixture 22. Heat shrink tube 31 includes a region protruding outward of acceleration sensor 10 and acceleration sensor mounting fixture 22 as viewed from above along a direction in which acceleration sensor 10 and acceleration sensor mounting fixture 22 are in alignment with each other. Acceleration sensor mounting fixture 22 can electrically insulate between acceleration sensor 10 and object under measurement 1.

First, since acceleration sensor mounting fixture 22 can electrically insulate between acceleration sensor 10 and object under measurement 1, for example, the dielectric strength of vibration measurement device 100 is improved as compared with a case where conductive acceleration sensor mounting fixture 21 is disposed. This makes acceleration sensor 10 less prone to failure.

Further, since heat shrink tube 31 protrudes outward of acceleration sensor 10 (sensor outer edge 10a) and acceleration sensor mounting fixture 22 (mounting fixture outer edge 22a), it is possible to increase creepage distance 63 between acceleration sensor 10 and object under measurement 1 as compared with a case where the heat shrink tube does not protrude outward, as in the first embodiment. That is, the dielectric strength between acceleration sensor 10 and object under measurement 1 obtained by the insulating property of acceleration sensor mounting fixture 22 is further enhanced by the extension of creepage distance 63.

In the present embodiment, since the acceleration sensor mounting fixture has an insulating property, creepage distance 63 is from acceleration sensor 10 to object under measurement 1, unlike the first embodiment. The action and effect obtained by increasing creepage distance 63, however, are similar to those of the first embodiment. That is, the dielectric strength of vibration measurement device 100 is increased by acceleration sensor mounting fixture 22 having an insulating property and heat shrink tube 31 protruding outward of acceleration sensor 10 and the like to increase creepage distance 63.

Note that, as described in the first embodiment (FIG. 6), in a case where an insulating acceleration sensor mounting fixture is generally used, frequency response characteristics become poor particularly in a high frequency band as compared with a case where a conductive (metal) acceleration sensor mounting fixture is used. Therefore, vibration measurement device 100 having the configuration of the present embodiment is preferably used particularly for measurement at a frequency of about 7000 Hz or less, that is, from a low frequency band to a medium frequency band.

Sixth Embodiment (Configuration of Vibration Measurement Device)

FIG. 17 is a diagram schematically illustrating a configuration of a vibration measurement device according to a sixth embodiment. Note that FIG. 17 corresponds to FIG. 14. With reference to FIG. 17, vibration measurement device 100 according to the present embodiment is basically identical in configuration to vibration measurement device 100 illustrated in FIG. 14, so that the same description will not be repeated. In vibration measurement device 100 in FIG. 17, acceleration sensor mounting fixture 22 whose housing is made of an insulating material is disposed instead of acceleration sensor mounting fixture 21 whose housing is made of a conductive material. An insulating coating agent 64 that is either an adhesive or grease, is applied to a gap between a side (lower side) of spacer 34 adjacent to object under measurement 1 and acceleration sensor mounting fixture 22. Applying insulating coating agent 64 fills the gap between spacer 34 and acceleration sensor mounting fixture 22.

(Action and Effect)

In vibration measurement device 100 described above, acceleration sensor mounting fixture 22 may be capable of electrically insulating between acceleration sensor 10 and object under measurement 1. Insulating coating agent 64 as either an adhesive or grease may be disposed in a gap between spacer 34 as an insulating member and acceleration sensor mounting fixture 22. As described above, the dielectric strength between acceleration sensor 10 and object under measurement 1 obtained by the insulating property of acceleration sensor mounting fixture 22 is further enhanced by the extension of creepage distance 63 due to spacer 34 protruding outward of acceleration sensor 10 and the like as in the fifth embodiment (FIG. 16).

Seventh Embodiment (Configuration of Vibration Measurement Device)

Figure 18:
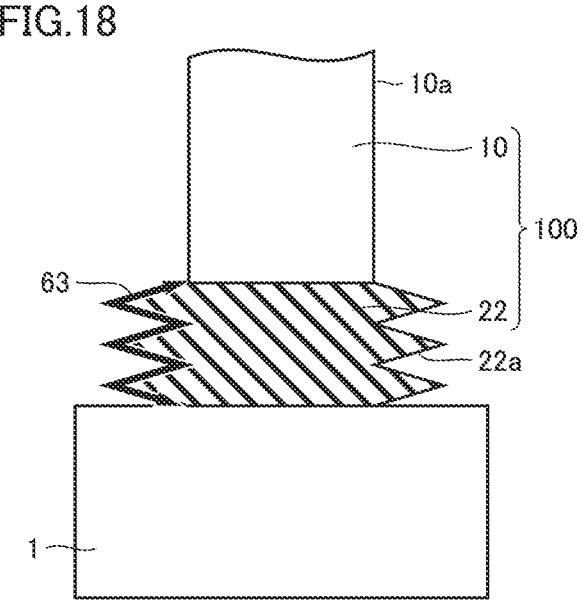
FIG. 18 is a diagram schematically illustrating a configuration of a vibration measurement device according to a seventh embodiment.

FIG. 18 is a diagram schematically illustrating a configuration of a vibration measurement device according to a seventh embodiment. Note that FIG. 18 corresponds to a configuration diagram of the vibration measurement device according to each of the other embodiments such as in FIGS. 1 and 16. With reference to FIG. 18, vibration measurement device 100 according to the present embodiment is basically identical in configuration to vibration measurement devices 100 in the other embodiments such as in FIGS. 1 and 16, so that the same description will not be repeated. Vibration measurement device 100 in FIG. 18 does not include heat shrink tube 31. In vibration measurement device 100 in FIG. 18, mounting fixture outer edge 22a that is an outer edge of acceleration sensor mounting fixture 22 has a part protruding outward of outer edge of the acceleration sensor (sensor outer edge 10a) as viewed from above. In the cross-sectional view in FIG. 18, the part of mounting fixture outer edge 22a protruding outward extends in a direction intersecting the left-right direction in FIG. 18 along a connection surface where acceleration sensor mounting fixture 22 is connected to acceleration sensor 10. That is, mounting fixture outer edge 22a extends in a direction having an angle with respect to the left-right direction (direction excluding the left-right direction and a direction approximately coincides with the left-right direction) as the intersecting direction. In this respect, the present embodiment is different from each of the other embodiments described above in which mounting fixture outer edges 22a and 21a are each disposed so as to be approximately in alignment with sensor outer edge 10a as viewed from above.

Mounting fixture outer edge 22a in FIG. 18 has a wave shape. That is, the cross-sectional shape of mounting fixture outer edge 22a is a shape that alternately extends toward the center of acceleration sensor 10 and away from the center of acceleration sensor 10 as viewed along the radial direction (left-right direction in FIG. 18) radially extending from the center of acceleration sensor 10 as viewed from above. Mounting fixture outer edge 22a alternately extends inward and outward of acceleration sensor 10 a plurality of times as viewed from above as it goes from acceleration sensor 10 toward object under measurement 1. In FIG. 18, the innermost side of mounting fixture outer edge 22a is a position that is in alignment with sensor outer edge 10a as viewed from above, and the outermost side of mounting fixture outer edge 22a is located outside sensor outer edge 10a as viewed from above. Further, in the cross-sectional shape in FIG. 18, mounting fixture outer edge 22a linearly extends and alternately bends inward and outward. Mounting fixture outer edge 22a therefore has a part protruding outward of sensor outer edge 10a as viewed from above. The present disclosure, however, is not limited to such an aspect, and for example, the innermost side of mounting fixture outer edge 22a may be located inside or outside sensor outer edge 10a. The outermost side of mounting fixture outer edge 22a may be located inside or outside the outermost position of mounting fixture outer edge 22a illustrated in FIG. 18. Although mounting fixture outer edge 22a in FIG. 18 linearly bends, mounting fixture outer edge 22a may have a curved cross-sectional shape. Note that the outermost side of mounting fixture outer edge 22a may be located in alignment with sensor outer edge 10a or inside sensor outer edge 10a as viewed from above. In this case, mounting fixture outer edge 22a does not have a part protruding outward of sensor outer edge 10a, but there is no problem as long as outer edge 22a has a wave shape alternately extending outward and inward a plurality of times.

In FIG. 18, mounting fixture outer edge 22a has a wave shape of three waves in its entirety. The number of waves of the wave shape, however, is determined as desired, and it is preferable that the total length of the wave shape be approximately equal to creepage distance 63 in FIG. 18 or greater than creepage distance 63 (that is, a length of three waves or more).

(Action and Effect)

In vibration measurement device 100 described above, acceleration sensor mounting fixture 22 is disposed on a side of acceleration sensor 10, adjacent to object under measurement 1. Acceleration sensor mounting fixture 22 is an insulating member capable of electrically insulating between acceleration sensor 10 and object under measurement 1. Mounting fixture outer edge 22a has a part protruding outward of sensor outer edge 10a as viewed from above. The protruding part extends in a direction intersecting a direction along the connection surface where acceleration sensor mounting fixture 22 is connected to acceleration sensor 10.

From a different perspective, vibration measurement device 100 according to the present embodiment includes acceleration sensor 10 and acceleration sensor mounting fixture 22. Acceleration sensor 10 includes element 11 capable of measuring vibrations of object under measurement 1. Acceleration sensor mounting fixture 22 is disposed on a side of acceleration sensor 10, adjacent to object under measurement 1. Acceleration sensor mounting fixture 22 can electrically insulate between acceleration sensor 10 and object under measurement 1. Mounting fixture outer edge 22a has a part protruding outward of sensor outer edge 10a as viewed from above. Therefore, as in the fifth embodiment (FIG. 16), the dielectric strength between acceleration sensor 10 and object under measurement 1 obtained by the insulating property of acceleration sensor mounting fixture 22 is further enhanced by the extension of creepage distance 63 due to the part of mounting fixture outer edge 22a protruding outward of sensor outer edge 10a.

In vibration measurement device 100 described above, the outer edge of acceleration sensor mounting fixture 22 (mounting fixture outer edge 22a) may have a wave shape. It is therefore possible to increase creepage distance 63 along mounting fixture outer edge 22a as compared with a case where mounting fixture outer edge 22a extends along the up-down direction in FIG. 18 and does not have a wave shape. Therefore, as in the fifth embodiment (FIG. 16), the dielectric strength between acceleration sensor 10 and object under measurement 1 obtained by the insulating property of acceleration sensor mounting fixture 22 is further enhanced by the extension of creepage distance 63 due to the wave shape of mounting fixture outer edge 22*a*. Note that, also due to mounting fixture outer edge 22*a* protruding outward of sensor outer edge 10*a* as viewed from above, creepage distance 63 is further increased as compared with a case where such a configuration is not provided.

Eighth Embodiment (Configuration of Vibration Measurement Device)

Figure 19:
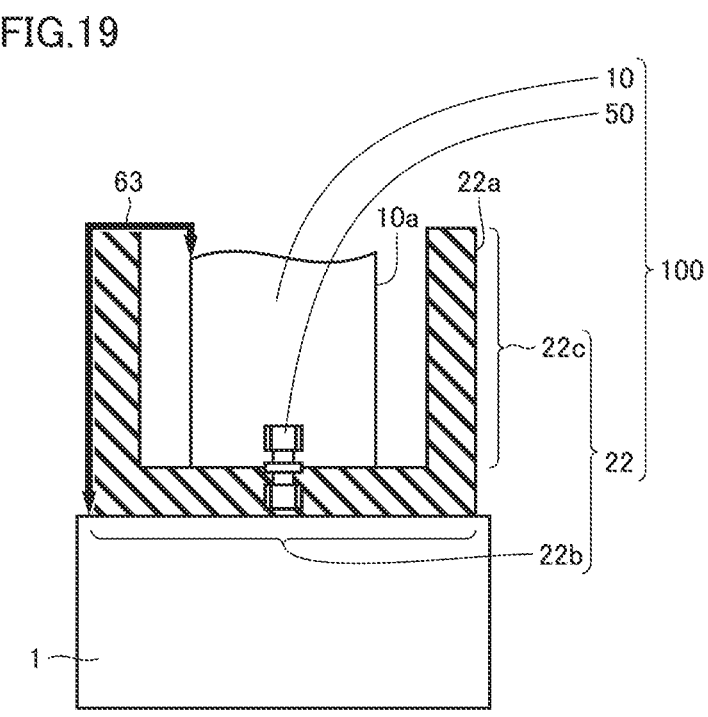
FIG. 19 is a diagram schematically illustrating a configuration of a vibration measurement device according to an eighth embodiment.

FIG. 19 is a diagram schematically illustrating a configuration of a vibration measurement device according to an eighth embodiment. With reference to FIG. 19, for example, the description of the same configuration as in FIG. 18 of vibration measurement device 100 according to the present embodiment will not be repeated. In vibration measurement device 100 in FIG. 19, the outer edge of insulating acceleration sensor mounting fixture 22 has a part protruding outward of acceleration sensor 10 as viewed from above.

Acceleration sensor mounting fixture 22 includes a first part 22*b* and a second part 22*c*. First part 22*b* is disposed on a side of (lower side in FIG. 19) of acceleration sensor 10, adjacent to object under measurement 1. That is, for example, as with acceleration sensor mounting fixture 22 of vibration measurement device 100 in FIG. 18, first part 22*b* is a part disposed between acceleration sensor 10 and object under measurement 1. First part 22*b* extends in a direction along a contact surface where acceleration sensor 10 and acceleration sensor mounting fixture 22 are in contact with each other, that is, in the left-right direction in FIG. 19. Therefore, first part 22*b* further includes a part disposed outside a part in alignment with acceleration sensor 10 as viewed from above (left and right regions of acceleration sensor 10 in FIG. 19). Second part 22*c* is continuous with first part 22*b*, bends from first part 22*b* particularly in the cross-sectional shape illustrated in FIG. 19, and extends upward away from first part 22*b*. Second part 22*c* is a part that bends at a right angle at both left and right ends of first part 22*b* and extends upward from the bending portion in the cross-sectional shape in FIG. 19. Second part 22*c* is disposed spaced apart from acceleration sensor 10 in the left-right direction in the drawing (spaced apart radially (in the radial direction) from the center of acceleration sensor 10). Second part 22*c* extends in the up-down direction (along acceleration sensor 10) from the bending portion that is a boundary with first part 22*b* to, for example, a position in the up-down direction that is identical in height to the uppermost portion of acceleration sensor 10. That is, second part 22*c* extends in a direction intersecting a direction (first direction) along the connection surface between acceleration sensor 10 and acceleration sensor mounting fixture 22. Second part 22*c*, however, may extend to a position above the uppermost portion of acceleration sensor 10 (remote from first part 22*b*). Acceleration sensor 10 is surrounded by first part 22*b* and second part 22*c* of acceleration sensor mounting fixture 22 extending in directions orthogonal to each other and continuous with each other. In other words, acceleration sensor mounting fixture 22 is shaped to cover acceleration sensor 10 from outside.

The dimension of acceleration sensor mounting fixture 22 in the left-right direction in FIG. 19 along the contact surface where first part 22*b* (including the part that is in alignment with second part 22*c* as viewed from above) of acceleration sensor mounting fixture 22 is in into contact with acceleration sensor 10 is preferably greater than or equal to twice the dimension of acceleration sensor 10 in the left-right direction along the contact surface, and more preferably greater than or equal to three times the dimension.

(Action and Effect)

In vibration measurement device 100 according to the present embodiment, as in the seventh embodiment, mounting fixture outer edge 22*a* has a part protruding outward of sensor outer edge 10*a* as viewed from above. Acceleration sensor mounting fixture 22 includes first part 22*b* disposed on a side of acceleration sensor 10, adjacent to object under measurement 1 and extending in a direction along the contact surface where acceleration sensor 10 and acceleration sensor mounting fixture 22 are in contact with each other, and second part 22*c* bending from first part 22*b* and extending away from first part 22*b*. Acceleration sensor 10 is surrounded by first part 22*b* and second part 22*c* of acceleration sensor mounting fixture 22. First part 22*b* extends to a region outside acceleration sensor 10 as viewed from above, and second part 22*c* further extends from the region, thereby allowing a significant increase in creepage distance 63 along outer edge 22*a* of acceleration sensor mounting fixture 22 and the like. This is because creepage distance 63 is longer than or equal to the sum of the dimension of first part 22*b* extending from acceleration sensor 10 outward of acceleration sensor 10 and the dimension of second part 22*c* extending from first part 22*b* in the up-down direction (and the dimension of the thickness of first part 22*b* in the up-down direction). Therefore, as in the fifth embodiment (FIG. 16), the dielectric strength between acceleration sensor 10 and object under measurement 1 obtained by the insulating property of acceleration sensor mounting fixture 22 is further enhanced by the extension of creepage distance 63 due to the presence of second part 22*c*.

Ninth Embodiment (Configuration of Vibration Measurement Device)

Figures 20, 21:
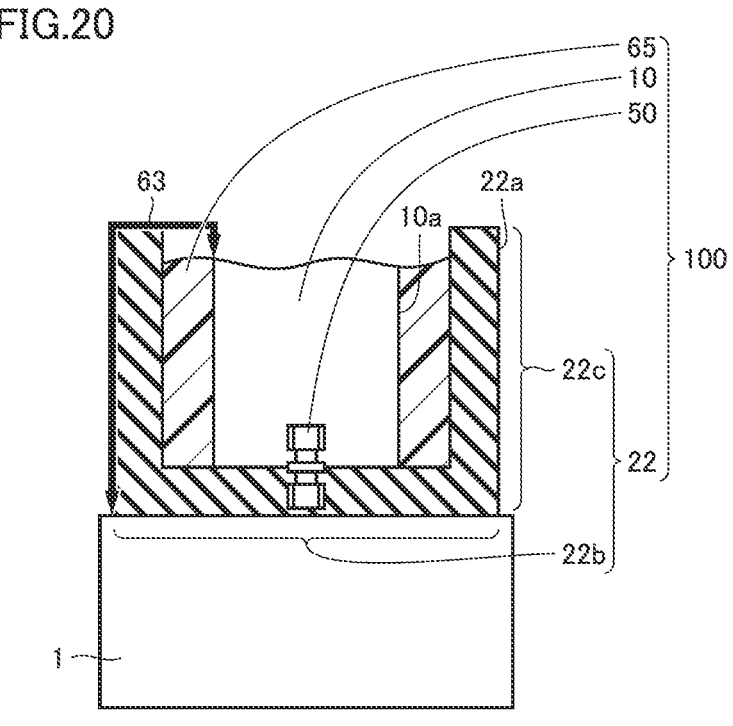
FIG. 20 is a diagram schematically illustrating a configuration of a vibration measurement device according to a ninth embodiment.
FIG. 21 is a diagram schematically illustrating a configuration of a vibration measurement device according to a tenth embodiment.

FIG. 20 is a diagram schematically illustrating a configuration of a vibration measurement device according to a ninth embodiment. With reference to FIG. 20, vibration measurement device 100 according to the present embodiment is basically identical in configuration to FIG. 19, so that the description of the configuration identical to FIG. 19 will not be repeated. In vibration measurement device 100 in FIG. 20, a gap filler 65 for filling a gap between second part 22*c* of acceleration sensor mounting fixture 22 and acceleration sensor 10 is disposed. Gap filler 65 is preferably made of a material that is higher in dielectric strength than air. Specifically, any one of mortar, a repair material (putty for repair), or an adhesive, each of which has a high Young's modulus, may be used as gap filler 65. Note that the dielectric strength of gap filler 65 is preferably greater than or equal to 3.0 kV/mm. The Young's modulus of gap filler 65 is preferably greater than or equal to 2.5 GPa.

(Action and Effect)

Vibration measurement device 100 in FIG. 20 is different from vibration measurement device 100 in FIG. 19 in that gap filler 65 is provided. For example, the configuration in FIG. 19 may cause deterioration in frequency response characteristics of acceleration sensor mounting fixture 22. Disposing gap filler 65 as illustrated in FIG. 20, however, allows improvement in the frequency response characteristics of acceleration sensor mounting fixture 22 including gap filler 65.

Tenth Embodiment

FIG. 21 is a diagram schematically illustrating a configuration of a vibration measurement device according to a tenth embodiment. With reference to FIG. 21, vibration measurement device 100 according to the present embodiment is basically identical in configuration to FIG. 19, so that the description of the configuration identical to FIG. 19 will not be repeated. Vibration measurement device 100 in FIG. 21 has the same configuration as a configuration in which acceleration sensor mounting fixture 22 of vibration measurement device 100 in FIG. 19 does not include second part 22c but includes only first part 22b. Specifically, acceleration sensor mounting fixture 22 in FIG. 21 has a part protruding outward of acceleration sensor 10 as viewed from above. Acceleration sensor mounting fixture 22 in its entirety extends in a direction along the contact surface where acceleration sensor 10 and acceleration sensor mounting fixture 22 are in contact with each other, that is, in the left-right direction in FIG. 19. A dimension W1 of acceleration sensor mounting fixture 22 in the direction along the contact surface where acceleration sensor 10 and acceleration sensor mounting fixture 22 are in contact with each other is greater than or equal to three times a dimension W2 of acceleration sensor 10 in the direction along the contact surface. Note that dimension W1 is more preferably greater than or equal to five times dimension W2.

(Action and Effect)

According to the present embodiment, acceleration sensor mounting fixture 22 is larger than acceleration sensor 10 as viewed from above. Acceleration sensor mounting fixture 22 is disposed in both a region that is in alignment with acceleration sensor 10 as viewed from above and a region outside acceleration sensor 10. As a result, for example, as compared with a case where acceleration sensor mounting fixture 22 has the same dimension as dimension W2 of acceleration sensor 10, an area where acceleration sensor mounting fixture 22 is in contact with object under measurement 1 immediately below acceleration sensor mounting fixture 22 becomes large. Therefore, according to the present embodiment, as illustrated in FIG. 21, an amount corresponding to a difference between dimension W1 and dimension W2 is added as a part of creepage distance 63 from acceleration sensor 10 to object under measurement 1. Therefore, according to the present embodiment, for example, creepage distance 63 can be increased as compared with a case where acceleration sensor mounting fixture 22 has the same dimension as dimension W2 of acceleration sensor 10. As a result, as in the fifth embodiment (FIG. 16), the dielectric strength between acceleration sensor 10 and object under measurement 1 obtained by the insulating property of acceleration sensor mounting fixture 22 is further enhanced by the extension of creepage distance 63.

Eleventh Embodiment

Figure 22:
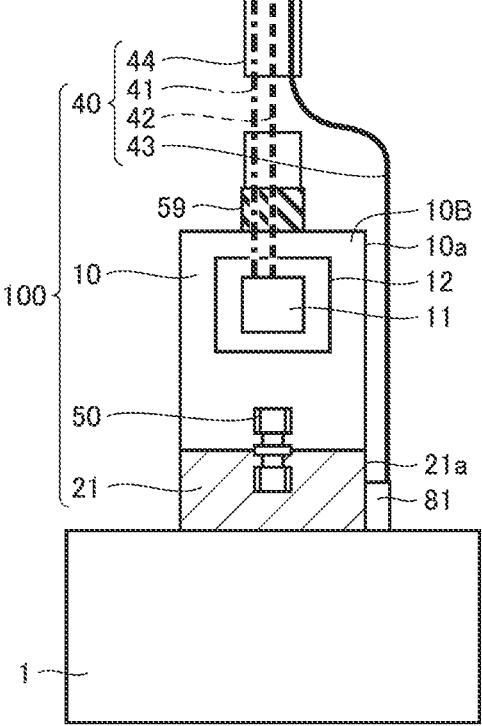
FIG. 22 is a diagram schematically illustrating a configuration of a vibration measurement device according to an eleventh embodiment.

FIG. 22 is a diagram schematically illustrating a configuration of a vibration measurement device according to an eleventh embodiment. Note that FIG. 22 corresponds to FIG. 1. Note that, in the eleventh to fourteenth embodiments, only a part of acceleration sensor cable 40 is illustrated. Ground points G1 and G2 exist as in FIG. 1, but illustration of ground points G1 and G2 is omitted.

With reference to FIG. 22, vibration measurement device 100 according to the present embodiment is basically identical in configuration to vibration measurement device 100 illustrated in FIG. 1, so that the same description will not be repeated. Vibration measurement device 100 of the present embodiment, however, include neither heat shrink tube 31 nor spacer 32, and acceleration sensor cable 40 is electrically connected to acceleration sensor 10. Specifically, shield line 43 included in acceleration sensor cable 40 has one end connected to a ground terminal 81. The one end here is the lower side in FIG. 22, that is, a side of acceleration sensor 10, adjacent to acceleration sensor mounting fixture 21. Ground terminal 81 is installed so as to be in contact with acceleration sensor mounting fixture 21 and to be electrically connectable to acceleration sensor mounting fixture 21. Note that ground terminal 81 may be installed so as to be in contact with object under measurement 1 and to be electrically continuous with object under measurement 1. That is, shield line 43 may be installed so as to be electrically continuous with object under measurement 1. In FIG. 22, ground terminal 81 is in contact with both acceleration sensor mounting fixture 21 and object under measurement 1 so as to be electrically continuous with both acceleration sensor mounting fixture 21 and object under measurement 1, and such a configuration may be employed.

In vibration measurement device 100, two paths, a first path and a second path, through which a current can flow are formed. The first path is a path through which shield line 43 extends from the bundle of the plurality of cable lines covered by sheath 44 of acceleration sensor cable 40 to ground terminal 81. That is, the first path is constituted by shield line 43. The second path is a path extending from first cable line 41 and second cable line 42 of acceleration sensor cable 40 to acceleration sensor mounting fixture 21 via element 11 of acceleration sensor 10 and conductive acceleration sensor housing 10B. The first path and the second path are arranged in parallel in the left-right direction in FIG. 22.

(Action and Effect)

Vibration measurement device 100 according to the present embodiment includes acceleration sensor 10, acceleration sensor mounting fixture 21, and acceleration sensor cable 40. Acceleration sensor 10 includes element 11 capable of measuring vibrations of object under measurement 1. Acceleration sensor mounting fixture 22 is disposed on a side of acceleration sensor 10, adjacent to a position where object under measurement 1 is to be disposed. Acceleration sensor cable 40 includes the pair of cable lines (first cable line 41 and second cable line 42), shield line 43, and sheath 44 that ties first cable line 41, second cable line 42, and shield line 43 together in a bundle and surrounds the lines from outside. The first path through which shield line 43 extends is disposed in parallel with the second path extending from acceleration sensor cable 40 to acceleration sensor mounting fixture 21 via acceleration sensor 10. Ground terminal 81 is connected to the first path so as to be electrically connectable to acceleration sensor mounting fixture 21. Shield line 43 is not connected to acceleration sensor 10, but is connected to acceleration sensor mounting fixture 21 (via ground terminal 81, for example).

The first path is a path through which shield line 43 connects a side (the upper side in FIG. 22) of acceleration sensor 10 remote from acceleration sensor mounting fixture 21 to ground terminal 81 electrically connected to acceleration sensor mounting fixture 21. The second path is a path extending from first cable line 41 and second cable line 42, and element 11 connected to first cable line 41 and second cable line 42 to acceleration sensor mounting fixture 21 through acceleration sensor housing 10B. When a surge voltage is applied to object under measurement 1 in FIG. 22, acceleration sensor mounting fixture 21 (object under measurement 1) and shield line 43 are electrically connected via ground terminal 81 of the first path. This causes a high voltage and a high current generated by the surge voltage to rapidly fall to the ground potential. Further, when a surge voltage is applied to object under measurement 1, almost no current flows through the second path extending in parallel with the first path. The reason why almost no current flows through the second path is that cavity 12 is present between element 11 to which first cable line 41 and the like are connected and acceleration sensor housing 10B to make the second path discontinuous. That is, the second path in its entirety is not electrically continuous due to the presence of cavity 12. Therefore, the second path is much larger in electrical resistance than the first path. The surge voltage passes through the first path in preference to the second path, so that it is possible to cause the surge voltage to rapidly fall in potential as described above. A high voltage is not applied to acceleration sensor 10 (element 11 of the second path), so that it is possible to reduce the possibility of a failure of acceleration sensor 10 (element 11 of the second path).

Twelfth Embodiment

Figure 23:
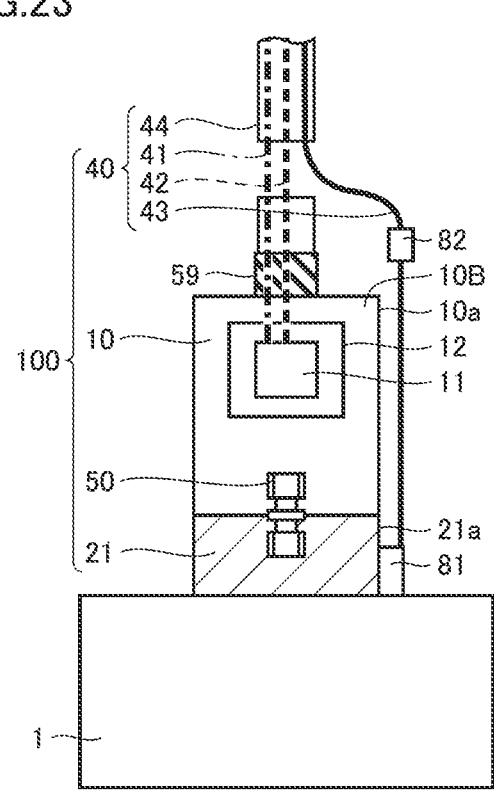
FIG. 23 is a diagram schematically illustrating a configuration of a vibration measurement device according to a twelfth embodiment.

FIG. 23 is a diagram schematically illustrating a configuration of a vibration measurement device according to a twelfth embodiment. Note that FIG. 23 corresponds to FIG. 22. With reference to FIG. 23, vibration measurement device 100 according to the present embodiment is basically identical in configuration to vibration measurement device 100 illustrated in FIG. 22, so that the same description will not be repeated. In vibration measurement device 100 in FIG. 23, however, a surge protector 82 is connected between one end of first path formed by shield line 43, the one end being connected to ground terminal 81, and the other end that is opposite to the one end (a side of acceleration sensor mounting fixture 21, adjacent to acceleration sensor 10). Surge protector 82 is a surge protective device (SPD). That is, vibration measurement device 100 of the present embodiment includes the SPD.

Figure 24:
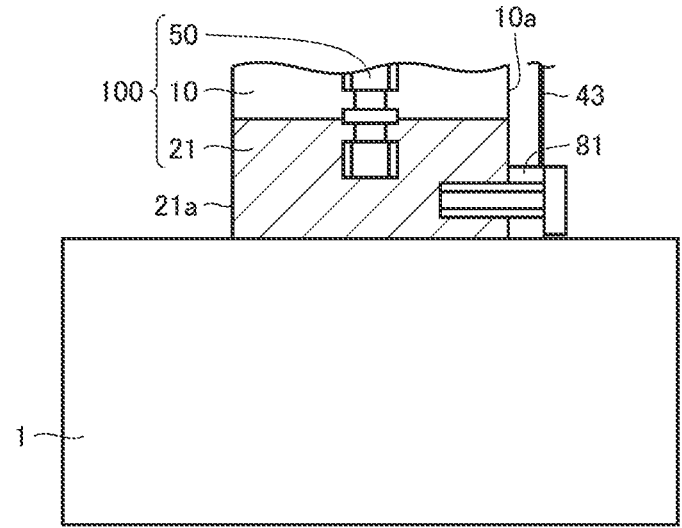
FIG. 24 is a diagram schematically illustrating a first example of how a ground terminal and the acceleration sensor mounting fixture in FIGS. 22 and 23 are connected.

FIG. 24 is a diagram schematically illustrating a first example of how the ground terminal and the acceleration sensor mounting fixture in FIGS. 22 and 23 are connected. With reference to FIG. 24, a screw is tightened to fix ground terminal 81 in the eleventh embodiment and the twelfth embodiment to acceleration sensor mounting fixture 21. Specifically, for example, an internal thread is formed in the conductive housing of acceleration sensor mounting fixture 21, and ground terminal 81 is attached to the internal thread, and an external screw is tightened from above. As a result, ground terminal 81 is fixed to the conductive housing of acceleration sensor mounting fixture 21 with ground terminal 81 in contact with the conductive housing. Such a fixing mode may be employed.

Figure 25:
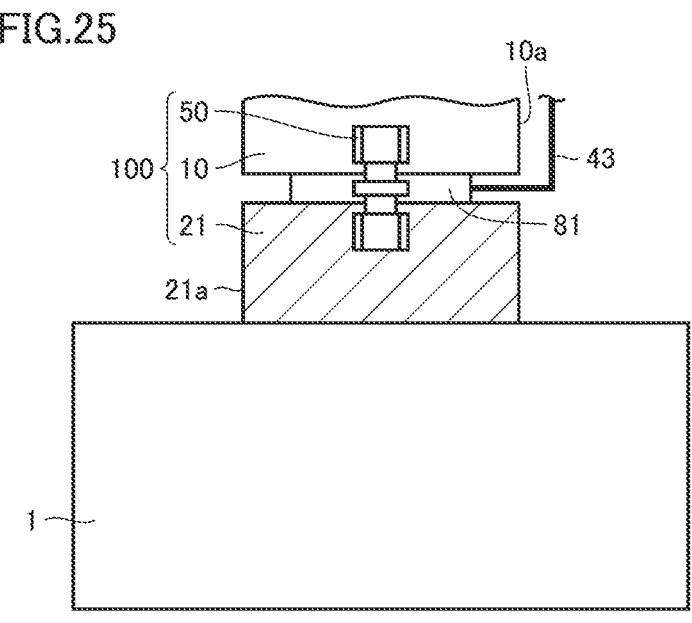
FIG. 25 is a diagram schematically illustrating a second example of how the ground terminal and the acceleration sensor mounting fixture in FIGS. 22 and 23 are connected.

FIG. 25 is a diagram schematically illustrating a second example of how the ground terminal and the acceleration sensor mounting fixture in FIGS. 22 and 23 are connected. Here, an internal thread may be formed in ground terminal 81 so as to allow stud 50 used to fix acceleration sensor 10 and acceleration sensor mounting fixture 21 together to pass through ground terminal 81, and the internal thread and an external thread formed on stud 50 may be tightened together. That is, in FIG. 25, acceleration sensor 10, acceleration sensor mounting fixture 21, and ground terminal 81 are coupled together by stud 50.

Note that in both of the examples in FIGS. 24 to 25, ground terminal 81 and either one of acceleration sensor mounting fixture 21 or acceleration sensor 10 may be fixed by tape or the like.
(Action and Effect)

Vibration measurement device 100 according to the present embodiment has the same configuration features as the configuration features of the eleventh embodiment. In vibration measurement device 100, shield line 43 may has one end connected to ground terminal 81, and surge protector 82 may be connected between the other end opposite to the one end in the first path and the one end.

If acceleration sensor mounting fixture 21 and object under measurement 1 are joined together by insulating adhesive 61 as illustrated in FIG. 4, object under measurement 1 and acceleration sensor mounting fixture 21 are electrically insulated from each other. In this case, ground loop GL in FIG. 9 does not occur under normal conditions (with no surge voltage applied to object under measurement 1). Surge protector 82 blocks a current under normal conditions, so that no current flows through the first path of shield line 43. Further, since the second path extending from acceleration sensor cable 40 through acceleration sensor 10 (element 11) and acceleration sensor mounting fixture 21 is discontinuous due to cavity 12, no current flows, and since object under measurement 1 and acceleration sensor mounting fixture 21 (acceleration sensor housing 10B) are insulated from each other, no current flows.

However, when a surge voltage is applied to object under measurement 1, surge protector 82 serves like a conductor. This makes the first path of shield line 43 electrically continuous between acceleration sensor mounting fixture 21 (ground terminal 81) and acceleration sensor 10 connected to acceleration sensor cable 40. As a result, a potential difference between acceleration sensor mounting fixture 21 (and object under measurement 1 in common contact with ground terminal 81) and acceleration sensor 10 is eliminated, and ground terminal 81 causes a high voltage and a high current generated by the surge voltage to rapidly fall to the ground potential. On the other hand, for the same reason as in the eleventh embodiment (FIG. 22), when a surge voltage is applied to object under measurement 1, almost no current flows through the second path extending in parallel with the first path. As described above, as in the eleventh embodiment, since the surge voltage passes through the first path in preference to the second path, no high voltage is applied to acceleration sensor 10 (element 11 of the second path), and it is therefore possible to reduce the possibility of a failure of acceleration sensor 10 (element 11 of the second path).

As described above, in the present embodiment, since surge protector 82 is installed, ground loop GL (see FIG. 9) does not occur under normal conditions where no surge voltage is applied to object under measurement 1, and no noise current is generated accordingly. However, when a surge voltage is applied to object under measurement 1, surge protector 82 electrically connects object under measurement 1 and shield line 43. It is therefore possible to prevent a high voltage from being applied to element 11 inside acceleration sensor 10 and a high current from flowing through element 11.

Thirteenth Embodiment

FIG. 26 is a diagram schematically illustrating a configuration of a vibration measurement device according to a thirteenth embodiment. With reference to FIG. 26, vibration measurement device 100 according to the present embodiment is basically identical in configuration to FIG. 22, so that the same description will not be repeated. However, unlike FIG. 22, vibration measurement device 100 of the present embodiment is provided with acceleration sensor mounting fixture 22 instead of acceleration sensor mounting fixture 21. In vibration measurement device 100 of the present embodiment, a conductive connector 83 is connected so as to be in contact with acceleration sensor 10.

Conductive connector 83 is attached to the upper surface (top surface) of acceleration sensor housing 10B in FIG. 26 remote from acceleration sensor mounting fixture 22 so as to be in contact with acceleration sensor housing 10B. Alternatively, conductive connector 83 may be installed so as to be in contact with a surface other than the top surface of acceleration sensor housing 10B. Conductive connector 83 is formed of a metal material, and conductive connector 83 is in contact with acceleration sensor housing 10B to electrically continuous with acceleration sensor 10. As described in the following embodiments, shield line 43 may be electrically connected to a side (upper side in FIG. 26) of an insulating member (here, a non-metal portion 22e) adjacent to acceleration sensor 10 rather than to acceleration sensor housing 10B.

Shield line 43 is connected to conductive connector 83. Further, in FIG. 26, acceleration sensor mounting fixture 22 includes the insulating member. Object under measurement 1 and acceleration sensor 10 are electrically insulated from each other by the insulating member. Specifically, acceleration sensor mounting fixture 22 of the present embodiment includes a metal portion 22d constituting a main body and non-metal portion 22e serving as the insulating member. Metal portion 22d is a member serving as the center of acceleration sensor mounting fixture 22, and has, for example, a rectangular parallelepiped shape (plate shape) as with entire acceleration sensor mounting fixture 22. Metal portion 22d may be made of metal or the like to become conductive. Non-metal portion 22e is disposed on an outer surface of metal portion 22d. That is, non-metal portion 22e is applied to or formed on the surface of metal portion 22d. For example, non-metal portion 22e may be formed all over the surface of metal portion 22d by alumite treatment, insulating coating treatment, or the like, or may be formed or the like on only a part of the surface of metal portion 22d by the above-described treatment. For example, non-metal portion 22e may be disposed only on the bottom surface of metal portion 22d in FIG. 26 between object under measurement 1 and (metal portion 22d of) acceleration sensor mounting fixture 22 so as to be in contact with both object under measurement 1 and (metal portion 22d of) acceleration sensor mounting fixture 22. Alternatively, for example, non-metal portion 22e may be disposed only on an entire surface (top surface in FIG. 26) of metal portion 22d adjacent to acceleration sensor 10. Due to the presence of non-metal portion 22e, acceleration sensor mounting fixture 22 has an insulating property.

(Action and Effect)

In vibration measurement device 100 described above, object under measurement 1 and acceleration sensor 10 are electrically insulated from each other by non-metal portion 22e as the insulating member included in acceleration sensor mounting fixture 22. Shield line 43 may be electrically connected to a side of the insulating member, adjacent to acceleration sensor 10.

From a different perspective, vibration measurement device 100 according to the present embodiment includes acceleration sensor 10, acceleration sensor mounting fixture 21, and acceleration sensor cable 40. Acceleration sensor 10 includes element 11 capable of measuring vibrations of object under measurement 1. Acceleration sensor mounting fixture 22 is disposed on a side of acceleration sensor 10, adjacent to object under measurement 1. Acceleration sensor cable 40 is electrically connected to acceleration sensor 10. Acceleration sensor cable 40 includes shield line 43. Conductive connector 83 is connected to acceleration sensor 10 so as to be in contact with acceleration sensor 10. Shield line 43 is connected to conductive connector 83. The insulating film (non-metal portion 22e) is sandwiched between object under measurement 1 and acceleration sensor 10.

Object under measurement 1 and acceleration sensor 10 are electrically insulated from each other by non-metal portion 22e. In this case, ground loop GL in FIG. 9 does not occur under normal conditions (with no surge voltage applied to object under measurement 1). However, when a surge voltage is applied to object under measurement 1, creepage discharge is developed along, for example, non-metal portion 22e, thereby making object under measurement 1 and shield line 43 connected to conductive connector 83 in contact with acceleration sensor 10 electrically continuous. Almost no current flows through the second path including element 11, the second path extending in parallel to the first path constituted by shield line 43. This is because the second path is higher in electrical resistance than the first path as in the eleventh and twelfth embodiments. As described above, as in the eleventh embodiment, since the surge voltage passes through the first path in preference to the second path, no high voltage is applied to acceleration sensor 10 (element 11 of the second path), and it is therefore possible to reduce the possibility of a failure of acceleration sensor 10 (element 11 of the second path). As described above, the present embodiment produces basically the same action and effect as produced by the twelfth embodiment.

In vibration measurement device 100 described above, shield line 43 may be electrically connected to conductive connector 83, and shield line 43 may be electrically connected to, for example, acceleration sensor 10 by conductive connector 83. When conductive connector 83 is used, unlike the case where the insulating connector 59 (see FIG. 10) is used, shield line 43 can be made electrically continuous with acceleration sensor 10 via conductive connector 83. It is therefore possible to form the first path with ease.

In vibration measurement device 100 described above, acceleration sensor mounting fixture 22 may include metal portion 22d and non-metal portion 22e as the insulating member. Providing non-metal portion 22e on the surface of metal portion 22d allows acceleration sensor mounting fixture 22 to produce both an effect of making the accuracy of vibration measurement high enough due to the presence of conductive metal portion 22d and an effect of improving the dielectric strength of vibration measurement device 100 (reducing the possibility of a failure of acceleration sensor 10) due to the insulation between acceleration sensor 10 and object under measurement 1 obtained by non-metal portion 22e being the insulating member. The insulating member (non-metal portion 22e) may be an insulating film coated on the surface of metal portion 22d. The insulating member (non-metal portion 22e) may be formed of either resin or ceramic. As illustrated in FIG. 26, non-metal portion 22e may be in contact with object under measurement 1.

Fourteenth Embodiment

Figure 27:
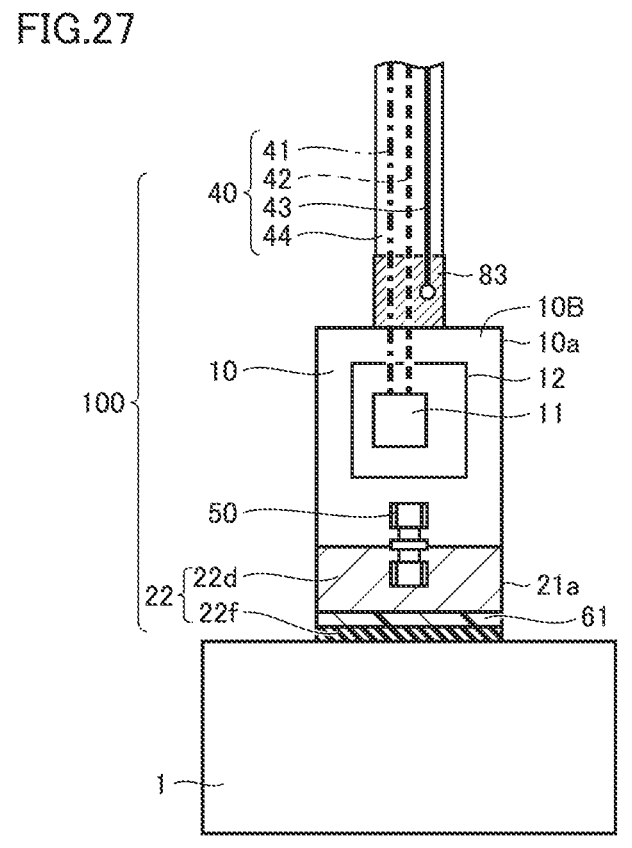

FIG. 27 is a diagram schematically illustrating a configuration of a vibration measurement device according to a fourteenth embodiment. With reference to FIG. 27, vibration measurement device 100 according to the present embodiment is basically identical in configuration to FIG. 26, so that the same description will not be repeated. In the present embodiment, however, acceleration sensor mounting fixture 22 includes metal portion 22d and a non-metal portion 22f as an insulating member. Non-metal portion 22f is, for example, a plate-shaped member having a rectangular shape as viewed from above and having a thickness in the up-down direction illustrated in FIG. 27. Non-metal portion 22*f* is obtained by machining a member having an insulating property such as a resin material or a ceramic material into a plate shape. As illustrated in FIG. 27, the top surface of non-metal portion 22*f* and the bottom surface of metal portion 22*d* may be joined together by adhesive 61. Alternatively, although not illustrated, the top surface of non-metal portion 22*f* and the bottom surface of metal portion 22*d* may be joined together by, for example, a laser.

That is, in the present embodiment, non-metal portion 22*f* as a plate-shaped member is disposed instead of non-metal portion 22*e* formed on the bottom surface of metal portion 22*d* as the coating film of the thirteenth embodiment. Even such a configuration produces basically the same action and effect as produced by the thirteenth embodiment 13.

Fifteenth Embodiment

Figure 28:
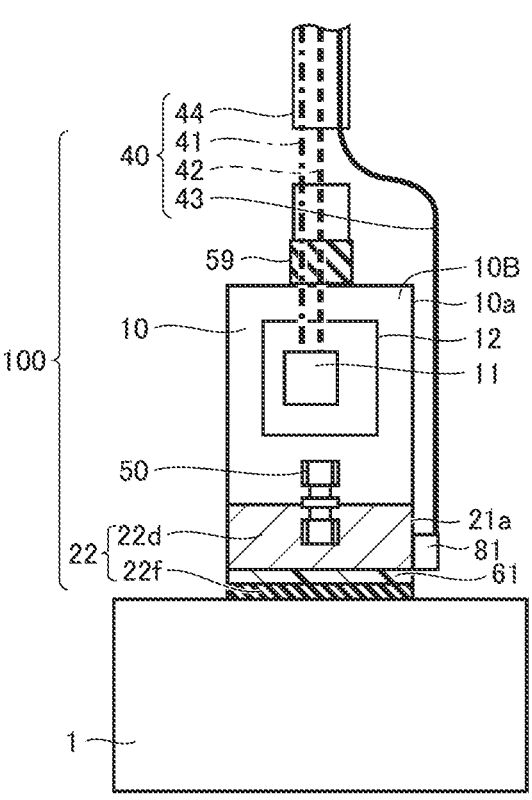
FIG. 28 is a diagram schematically illustrating a configuration of a vibration measurement device according to a fifteenth embodiment.

FIG. 28 is a diagram schematically illustrating a configuration of a vibration measurement device according to a fifteenth embodiment. With reference to FIG. 28, vibration measurement device 100 according to the present embodiment is basically identical in configuration to FIG. 22, so that the same description will not be repeated. In the present embodiment, however, unlike FIG. 22, acceleration sensor mounting fixture 22 is provided instead of acceleration sensor mounting fixture 21. As in FIG. 27 of the fourteenth embodiment, acceleration sensor mounting fixture 22 includes metal portion 22*d* and non-metal portion 22*f* joined to the bottom surface of metal portion 22*d* by, for example, adhesive 61. Although not illustrated, acceleration sensor mounting fixture 22 may include metal portion 22*d* and non-metal portion 22*e* as an insulating film coated on the surface of metal portion 22*d*, as in FIG. 26 of the thirteenth embodiment.

Further, FIG. 28 is different from FIGS. 26 and 27 in the connection position of shield line 43. In FIGS. 26 and 27, shield line 43 is connected to the top surface of acceleration sensor 10 by conductive connector 83. On the other hand, in FIG. 28, shield line 43 is connected to ground terminal 81 connected on a side surface of metal portion 22*d* of acceleration sensor mounting fixture 22.

As illustrated in FIGS. 26 and 27, shield line 43 may be connected to acceleration sensor 10. Alternatively, as illustrated in FIG. 28, shield line 43 may be connected to metal portion 22*d* joined immediately above non-metal portion 22*f* (insulating member). In any case, it is preferable that shield line 43 be electrically connected to a side (upper side in FIGS. 26 to 28) of the insulating member adjacent to acceleration sensor 10.

Sixteenth Embodiment

Figure 29:
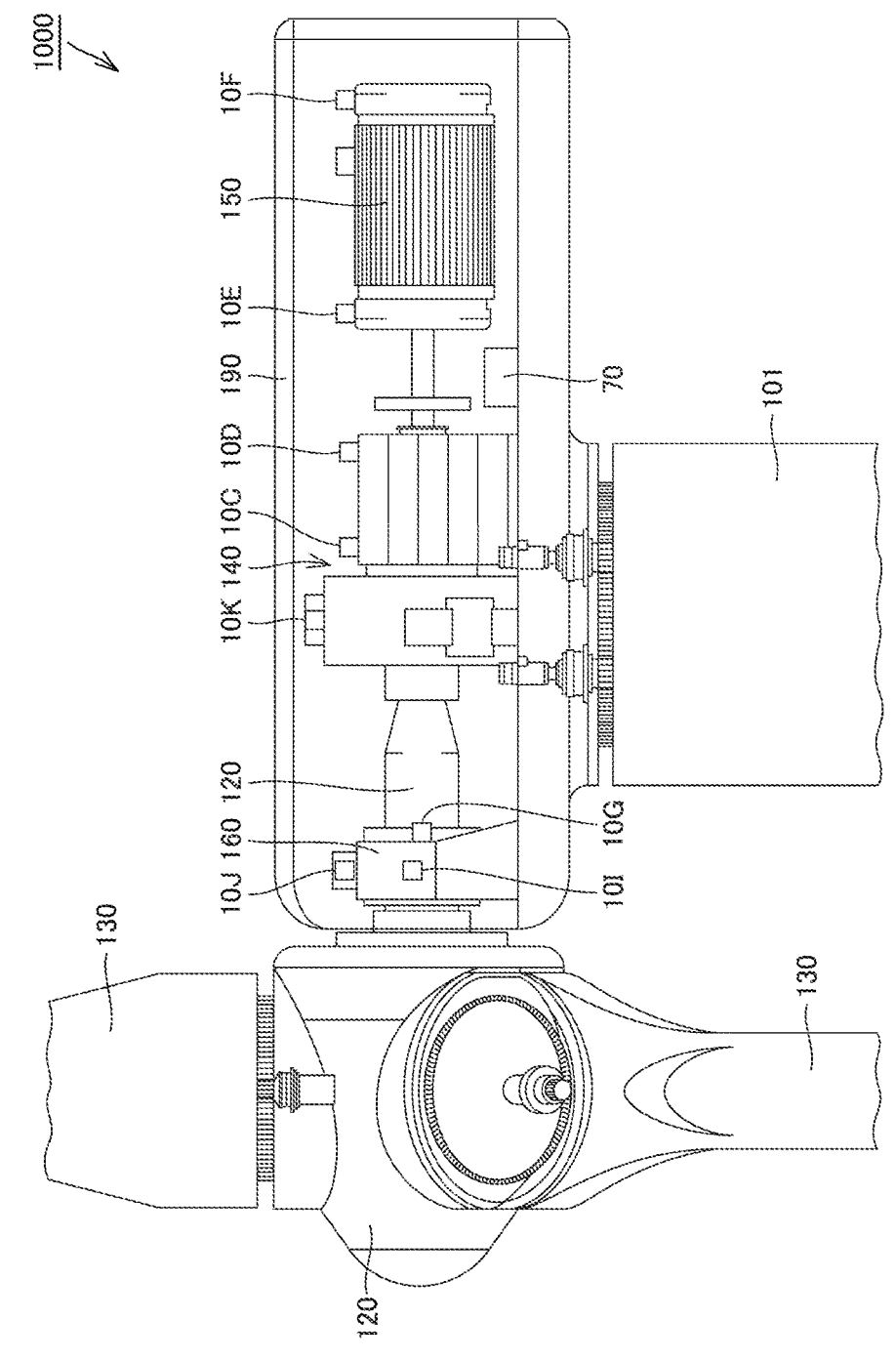
FIG. 29 is a diagram schematically illustrating a configuration of a wind-power generation device using the vibration measurement device according to each embodiment.

A wind-power generation device using vibration measurement device 100 described in each of the above-described embodiments will be described below.
<Configuration of Wind-Power Generation Device>
FIG. 29 is a diagram schematically illustrating a configuration of a wind-power generation device using the vibration measurement device according to each embodiment. With reference to FIG. 29, a wind-power generation device 1000 includes a main shaft 120, a blade 130, a speed-up gear 140, a generator 150, and a main bearing 160. Wind-power generation device 1000 includes sensors 10C to 10K and data collection device 70. Sensors 10C to 10K are each provided as acceleration sensor 10 included in vibration measurement device 100 according to each of the above-described embodiments. Data collection device 70 is provided as a CMS device for wind-power generation. Speed-up gear 140, generator 150, main bearing 160, sensors 10C to 10K, and data collection device 70 are housed in a nacelle 190, and nacelle 190 is supported by a tower 101.

Main shaft 120 enters nacelle 190 to connect to an input shaft of speed-up gear 140, and is rotatably supported by main bearing 160. Then, main shaft 120 transmits rotational torque produced by blade 130 receiving wind power to the input shaft of speed-up gear 140. Blade 130 is provided at the tip of main shaft 120, converts wind power into rotational torque, and transmits the rotational torque to main shaft 120.

Main bearing 160 is fixed in nacelle 190 and rotatably supports main shaft 120. Main bearing 160 includes a rolling bearing, and specifically includes a self-aligning roller bearing, a tapered roller bearing, a cylindrical roller bearing, a ball bearing, or the like. Note that each of such bearings may be a single-row bearing or a double-row bearing.

Sensors 10C to 10K are each fixed to a corresponding component inside nacelle 190. Specifically, sensor 10J is fixed to an upper surface of main bearing 160 and monitors a state of main bearing 160. Sensors 10K, 10C, and 10D are fixed to an upper surface of speed-up gear 140 and monitor a state of speed-up gear 140. Sensors 10E and 10F are fixed to an upper surface of generator 150 and monitor a state of generator 150. Sensor 10G is fixed to main bearing 160 and monitors misalignment and abnormal vibrations of the nacelle. Sensor 10I is fixed to main bearing 160 and monitors imbalance and abnormal vibrations of the nacelle.

Speed-up gear 140 is provided between main shaft 120 and generator 150, increases a speed of rotation of main shaft 120, and outputs the rotation to generator 150. As an example, speed-up gear 140 includes a gear speed-increasing mechanism including a planetary gear, an intermediate shaft, a high-speed shaft, and the like. Note that, although not particularly illustrated, a plurality of bearings that rotatably support a plurality of shafts are also provided in speed-up gear 140. Generator 150 is connected to an output shaft of speed-up gear 140 and generates power from the rotational torque received from speed-up gear 140. Generator 150 includes, for example, an induction generator. Note that a bearing that rotatably supports a rotor is also provided in generator 150.

Data collection device 70 is provided inside nacelle 190 and receives data such as vibrations, sounds, and acoustic emission (AE) of each component detected by sensors 10C to 10K. Note that, although not illustrated, sensors 10C to 10K and data collection device 70 are connected by a wire cable.

The features described in (each example included in) each of the above-described embodiments may be appropriately combined and applied within a range where there is no technical contradiction.

It should be understood that the embodiments disclosed herein are illustrative in all respects and not restrictive. The scope of the present invention is defined by the claims rather than the above description, and the present invention is intended to include the claims, equivalents of the claims, and all modifications within the scope of claims.

REFERENCE SIGNS LIST

1: object under measurement, 10: acceleration sensor, 10*a*: sensor outer edge, 10*h*, 21*h*: through hole, 10B: acceleration sensor housing, 11: element, 12: cavity, 21, 22: acceleration sensor mounting fixture, 21*a*, 22*a*: mounting fixture outer edge, 22*b*: first part, 22*c*: second part, 22*d*: metal portion, 22*e*, 22*f*: non-metal portion, 31: heat shrink tube, 32, 34: spacer, 33: adapter, 33*a*: adapter protrusion, 34*a*, 35*a*: spacer outer edge, 36, 39: insulating plate, 40: acceleration sensor cable, 41: first cable line, 42: second cable line, 43: shield line, 44: sheath, 50: stud, 61: adhesive, 62: filler, 63: creepage distance, 64: insulating coating agent, 65: gap filler, 70: data collection device, 81: ground terminal, 82: surge protector, 83: conductive connector, 100, 900: vibration measurement device, 101: tower, 120: main shaft, 130: blade, 140: speed-up gear, 150: generator, 160: main bearing, 190: nacelle, 1000: wind-power generation device, DCG: discharge, G1, G2: ground point, GL: ground loop, SV: surge voltage

The invention claimed is:

1. A vibration measurement device comprising:
an acceleration sensor including an element capable of measuring vibrations of an object under measurement;
an acceleration sensor mounting fixture disposed on a side of the acceleration sensor, adjacent to a position where the object under measurement is to be disposed;
an insulating member sandwiched between the acceleration sensor and the position where the object under measurement is to be disposed; and
an acceleration sensor cable including a pair of cable lines, a shield line, and a sheath that ties the pair of cable lines and the shield line together in a bundle and surrounds the pair of cable lines and the shield line from outside,
wherein a spring constant of the insulating member is greater than or equal to $2.0 \times 10^9$ N/m.

2. The vibration measurement device according to claim 1, wherein the insulating member includes a region protruding outward of the acceleration sensor and the acceleration sensor mounting fixture as viewed from above along a direction in which the acceleration sensor and the acceleration sensor mounting fixture are in alignment with each other.

3. The vibration measurement device according to claim 1, wherein
the insulating member is a single spacer having an insulating property,
the acceleration sensor and the acceleration sensor mounting fixture are coupled to each other by a fixing member having an insulating property, and
a filler is disposed in a gap between the fixing member, and the acceleration sensor and the acceleration sensor mounting fixture.

4. The vibration measurement device according to claim 1, further comprising a single tube having an insulating property, the tube covering an outer edge of the acceleration sensor and an outer edge of the acceleration sensor mounting fixture, wherein
the tube includes a region covering an outer periphery of the acceleration sensor and an outer periphery of the acceleration sensor mounting fixture as viewed from above along a direction in which the acceleration sensor and the acceleration sensor mounting fixture are in alignment with each other.

5. The vibration measurement device according to claim 1, wherein the acceleration sensor mounting fixture has conductivity.

6. The vibration measurement device according to claim 1, wherein the acceleration sensor mounting fixture is capable of electrically insulating between the acceleration sensor and the object under measurement, and
either an adhesive or grease is disposed in a gap between the insulating member and the acceleration sensor mounting fixture.

7. The vibration measurement device according to claim 1, wherein
the acceleration sensor mounting fixture is connected to a side of the acceleration sensor, adjacent to the object under measurement,
the acceleration sensor mounting fixture is the insulating member capable of electrically insulating between the acceleration sensor and the object under measurement, and
an outer edge of the acceleration sensor mounting fixture has a part protruding outward of an outer edge of the acceleration sensor as viewed from above, and the protruding part extends in a direction intersecting a direction along a connection surface where the acceleration sensor mounting fixture connects with the acceleration sensor.

8. The vibration measurement device according to claim 7, wherein the outer edge of the acceleration sensor mounting fixture has a wave shape.

9. The vibration measurement device according to claim 7, wherein
the acceleration sensor mounting fixture includes a first part disposed on the side of the acceleration sensor, adjacent to the object under measurement and extending in a direction along the connection surface, and a second part bending from the first part and extending away from the first part, and
the acceleration sensor is surrounded by the first part and the second part of the acceleration sensor mounting fixture.

10. The vibration measurement device according to claim 9, further comprising a gap filler disposed in a gap between the second part and the acceleration sensor, wherein
the gap filler is higher in dielectric strength than air.

11. The vibration measurement device according to claim 1, wherein
the object under measurement and the acceleration sensor are electrically insulated from each other by the insulating member included in the acceleration sensor mounting fixture, and
the shield line is electrically connected to a side of the insulating member, adjacent to the acceleration sensor.

12. The vibration measurement device according to claim 11, wherein
the shield line is electrically connected to a conductive connector, and
the shield line is electrically connected to the side of the insulating member, adjacent to the acceleration sensor by the conductive connector.

13. The vibration measurement device according to claim 11, wherein the acceleration sensor mounting fixture includes a metal portion, and a non-metal portion as the insulating member.

14. The vibration measurement device according to claim 13, wherein the insulating member is an insulating film with which a surface of the metal portion is coated.

15. The vibration measurement device according to claim 13, wherein the insulating member includes either resin or ceramic.

16. The vibration measurement device according to claim 13, wherein the insulating member is in contact with the object under measurement.

17. The vibration measurement device according to claim 13, wherein the metal portion and the insulating member are joined together by an adhesive.

18. A CMS device for wind-power generation using the vibration measurement device according to claim 1.

* * * * *